(12) United States Patent
Hino

(10) Patent No.: US 8,590,937 B2
(45) Date of Patent: *Nov. 26, 2013

(54) VEHICLE

(75) Inventor: Hidehiko Hino, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/322,642

(22) PCT Filed: Jun. 9, 2010

(86) PCT No.: PCT/JP2010/059742
§ 371 (c)(1),
(2), (4) Date: Nov. 28, 2011

(87) PCT Pub. No.: WO2010/143644
PCT Pub. Date: Dec. 16, 2010

(65) Prior Publication Data
US 2012/0067475 A1    Mar. 22, 2012

(30) Foreign Application Priority Data

Jun. 12, 2009  (JP) ................................. 2009-141342
Jun. 23, 2009  (JP) ................................. 2009-148963

(51) Int. Cl.
  *B60C 23/19*  (2006.01)
  *F28D 15/00*  (2006.01)

(52) U.S. Cl.
  USPC ......... 280/855; 165/41; 165/104.19; 301/6.3; 188/71.6; 188/264 A

(58) Field of Classification Search
  USPC .............. 280/855, 727; 153/153; 165/104.19, 165/104.11, 104.34, 41; 301/6.3; 188/264 R, 264 A, 264 AA, 264 B, 264 D, 188/264 E, 264 F, 71.6
  See application file for complete search history.

(56) References Cited

U.S. PATENT DOCUMENTS 2,540,043 A * 1/1951 Crooker ..................... 152/153
3,256,920 A * 6/1966 Byers ......................... 152/208

(Continued)

FOREIGN PATENT DOCUMENTS

DE    10 2006 011 919 A1    9/2006
EP    0 985 554 A1    3/2000

(Continued)

OTHER PUBLICATIONS

International Search Report for PCT/JP2010/059742 dated Aug. 17, 2010.

(Continued)

*Primary Examiner* — Drew Brown
(74) *Attorney, Agent, or Firm* — Birch, Stewart, Kolasch & Birch, LLP

(57) ABSTRACT

Disclosed is a vehicle equipped with air-filled tires, wherein heating of the air-filled tires during driving is minimized, and the durability of said tires is increased. Either many dimples are formed on the outside surface of at least one sidewall of the air-filled tires, or at least part of the outside surface of the sidewalls is formed using a good-thermal-conductivity rubber having a thermal conductivity of at least 0.40 W/(m·K). The vehicle is also provided with a cooling device that blows a gas that cools the air-filled tires from the outside.

18 Claims, 16 Drawing Sheets

(56) References Cited

U.S. PATENT DOCUMENTS

| | | | |
|---|---|---|---|
| 4,343,338 A * | 8/1982 | Hart | 152/153 |
| 4,771,822 A * | 9/1988 | Barbosa | 165/41 |
| 2004/0198890 A1 | 10/2004 | Kanenari | |
| 2011/0220325 A1 | 9/2011 | Hino | |
| 2011/0308676 A1 * | 12/2011 | Morozumi | 152/153 |

FOREIGN PATENT DOCUMENTS

| JP | 4-238703 A | 8/1992 |
|---|---|---|
| JP | 5-8620 A | 1/1993 |
| JP | 7-290916 A | 11/1995 |
| JP | 2006-182318 A | 7/2006 |
| JP | 2010-155576 A | 7/2010 |
| WO | WO 2004/013222 A1 | 2/2004 |
| WO | WO 2010/05580 A1 | 5/2010 |

OTHER PUBLICATIONS

Search Report for European Application No. 10 78 6175 dated Mar. 8, 2013.

* cited by examiner

VEHICLE

TECHNICAL FIELD

The present invention relates to a vehicle, and more particularly, to a technique capable of retarding heat generation of a pneumatic tire during running, and enhancing durability of the tire.

BACKGROUND ART

Distortion periodically occurs in a rubber portion of a tire during running, a portion of its energy is converted into heat and heat is generated. Especially when a vehicle runs in a state where an air pressure is reduced, the distortions of various portions are increased and heat generation is also increased. If a rubber temperature of the tire exceeds a certain value, destruction of the rubber starts. Therefore, in order to enhance the durability of the tire, it is effective to lower a temperature of the tire during running.

In recent years, to enhance convenience and safety and to widen a vehicle interior space, run flat tires are popular. A side-reinforced run flat tire that includes a side-reinforcing rubber layer having a substantially crescentic cross section inside of each of sidewalls is well known (see the following patent literature 1 for example). According to the run flat tire, even if the tire blows, the side-reinforcing rubber layer supports a tire load instead of the air pressure and deflection of the sidewall is limited. This retards the heat generation of the tire. Therefore, even if the run flat tire blows, it is possible to continuously run about 50 to 100 km at a speed of 60 to 80 km/h (such running is referred to also as "run flat running" hereafter).

However, at the time of run flat running where an air pressure is reduced, even the run flat tire generates heat in the side-reinforcing rubber layer in proportion to a running distance, and if the running distance exceeds a limit, the side-reinforcing rubber layer is destroyed due to heat generation.
[Patent Document 1] Japanese Patent Application Publication No. 2006-182318

SUMMARY OF INVENTION

Technical Problem

To retard the destruction of a tire caused by heat generation during the run flat running or a low-air pressure running, it is effective to enhance rigidities of various portions of the tire and to reduce the distortion. However, the tire reinforced by such a method has a drawback that a vertical spring excessively increases, the riding comfort is deteriorated and the tire weight is increased.

Hence, the present invention has been accomplished in view of such circumstances, and it is a main object of the invention to provide a vehicle capable of suppressing the heat generation during running and enhancing the durability of the tire without deteriorating the riding comfort and without increasing the weight of the tire.

Solution to Problem

A first aspect of the present application provides a vehicle having pneumatic tires, wherein a large number of dimples are formed in an outside surface of at least one of sidewalls of each of the pneumatic tires, and the vehicle includes a cooling device which blows gas for cooling the pneumatic tire from outside.

A second aspect of the application provides a vehicle having pneumatic tires, wherein at least a portion of an outside surface of each of sidewalls of the pneumatic tire is made of good-thermal-conductivity rubber having thermal conductivity of 0.40 W/(m·K) or more, and the vehicle includes a cooling device which blows gas toward the outside surface of the sidewall provided with the good-thermal-conductivity rubber, thereby cooling the tire from outside.

In the first and second aspects, it is preferable that the cooling device blows the gas toward the pneumatic tire when an air pressure in the pneumatic tire becomes equal to or lower than a predetermined value.

In the first and second aspects, it is preferable that the cooling device includes a duct, and the duct is provided at its one end with an air induction port into which air is taken, and at the other end with an issuing port from which the air blows toward the pneumatic tire.

In the first and second aspects, it is preferable that the cooling device includes a duct, and the duct is provided at its one end with an air induction port into which air is taken, and at the other end with an issuing port from which the air blows toward a brake device, and the cooling device also includes a changeover tool which blows at least a portion of air flowing through the duct toward the pneumatic tire when an air pressure in the pneumatic tire is reduced.

Advantageous Effects of Invention

According to the first aspect of the application, a large number of dimples are formed in the outside surface of the sidewall of the pneumatic tire. A surface area of the sidewall is increased due to the dimples and heat dissipation from the tire to the atmosphere is effectively promoted. The dimples generate a turbulent flow of air around the tire. The turbulent flow further promotes heat dissipation from the tire to the atmosphere. Further, the vehicle of the invention is provided with a cooling device that blows gas for cooling, from outside, the pneumatic tire having excellent heat dissipation performance.

According to the second aspect of the application, at least a portion of the outside surface of the sidewall of the pneumatic tire is made of good-thermal-conductivity rubber having a thermal conductivity of 0.40 W/(m·K). Therefore, heat generated by running is prone to be conducted to the outside surface of the sidewall through the good-thermal-conductivity rubber. The vehicle of the invention is provided with the cooling device which blows gas for cooling, from outside, the sidewall provided with the good-thermal-conductivity rubber. According to this, heat in the tire is efficiently discharged out.

Therefore, according to the first and second aspects, it is possible to effectively suppress the heat generation of a tire during running without excessively increasing a vertical spring constant of the tire. Especially, it is possible to retard the heat generation of a tire when the vehicle runs under a low air pressure, and to enhance durability of the tire. Especially when the pneumatic tire is a run flat tire, it is possible to remarkably increase a run flat continuous running distance and/or a run flat running speed.

Figure 1:
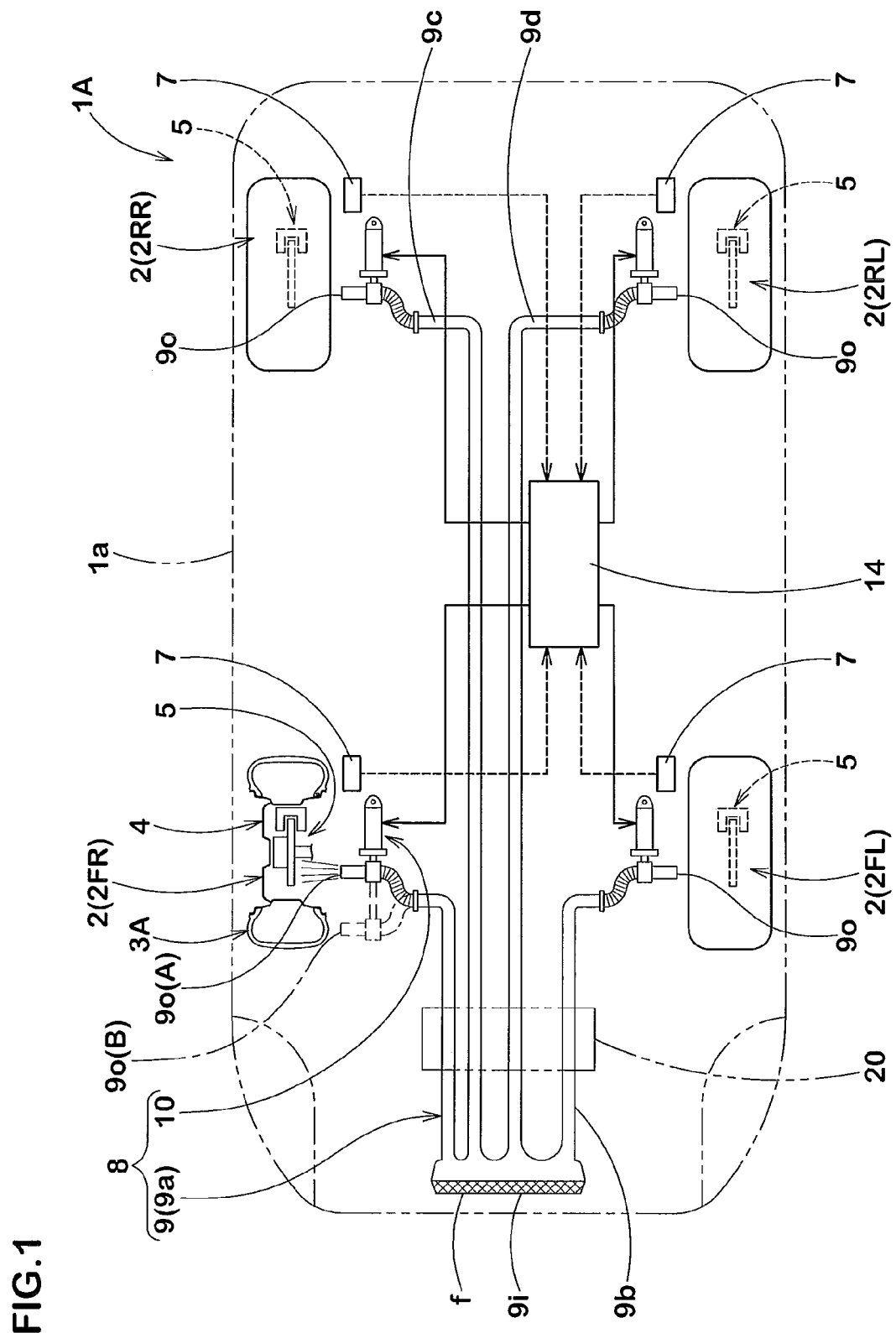
FIG. 1 is a schematic plan view showing an embodiment of a vehicle according to a first aspect of the invention.

REFERENCE SIGNS LIST 1A, 1B Vehicle
1a Vehicle body
2, 2FR, 2FL, 2RR, 2RL Wheel
3A, 3B Pneumatic tire
3b Sidewall
7 Air-pressure monitoring device
8 Cooling device
9 Duct
9i Air induction port
9o Issuing port
10 Changeover tool
11 Actuator
13 Dimple
14 Control device
15 Changeover valve
SG Sidewall rubber
G Gas

DESCRIPTION OF EMBODIMENTS

An embodiment of the present invention will be described on the basis of the drawings.

FIG. 1 is a schematic plan view of the embodiment of a vehicle 1A according to a first aspect of the invention. The vehicle 1A is a four-wheel car (passenger vehicle), and four wheels 2 are mounted on a vehicle body 1a. The four wheels 2 are a front right wheel 2FR, a front left wheel 2FL, a rear right wheel 2RR and a rear left wheel 2RL.

Figure 2:
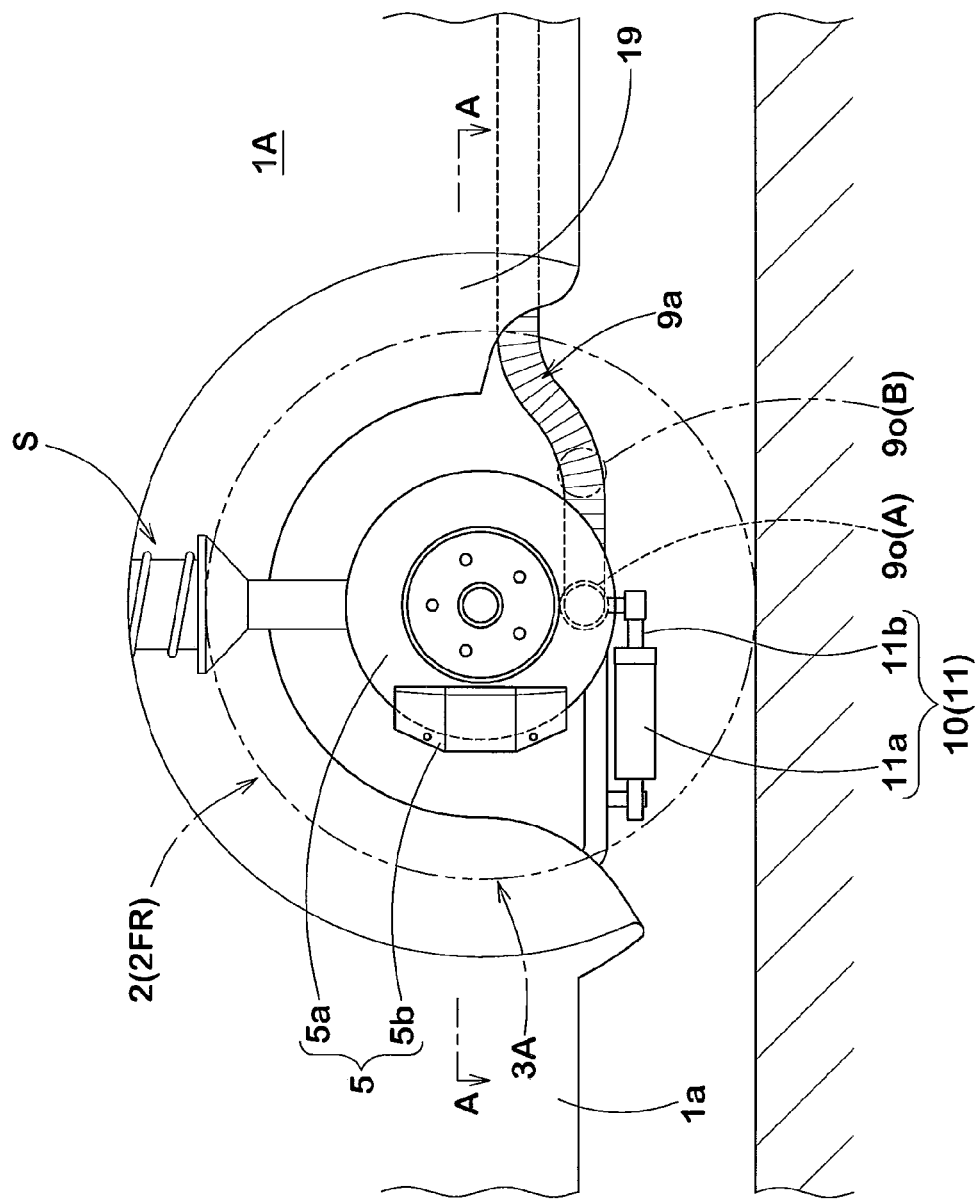
FIG. 2 is an enlarged view of an essential portion of a front right wheel and its periphery.
Figure 3:
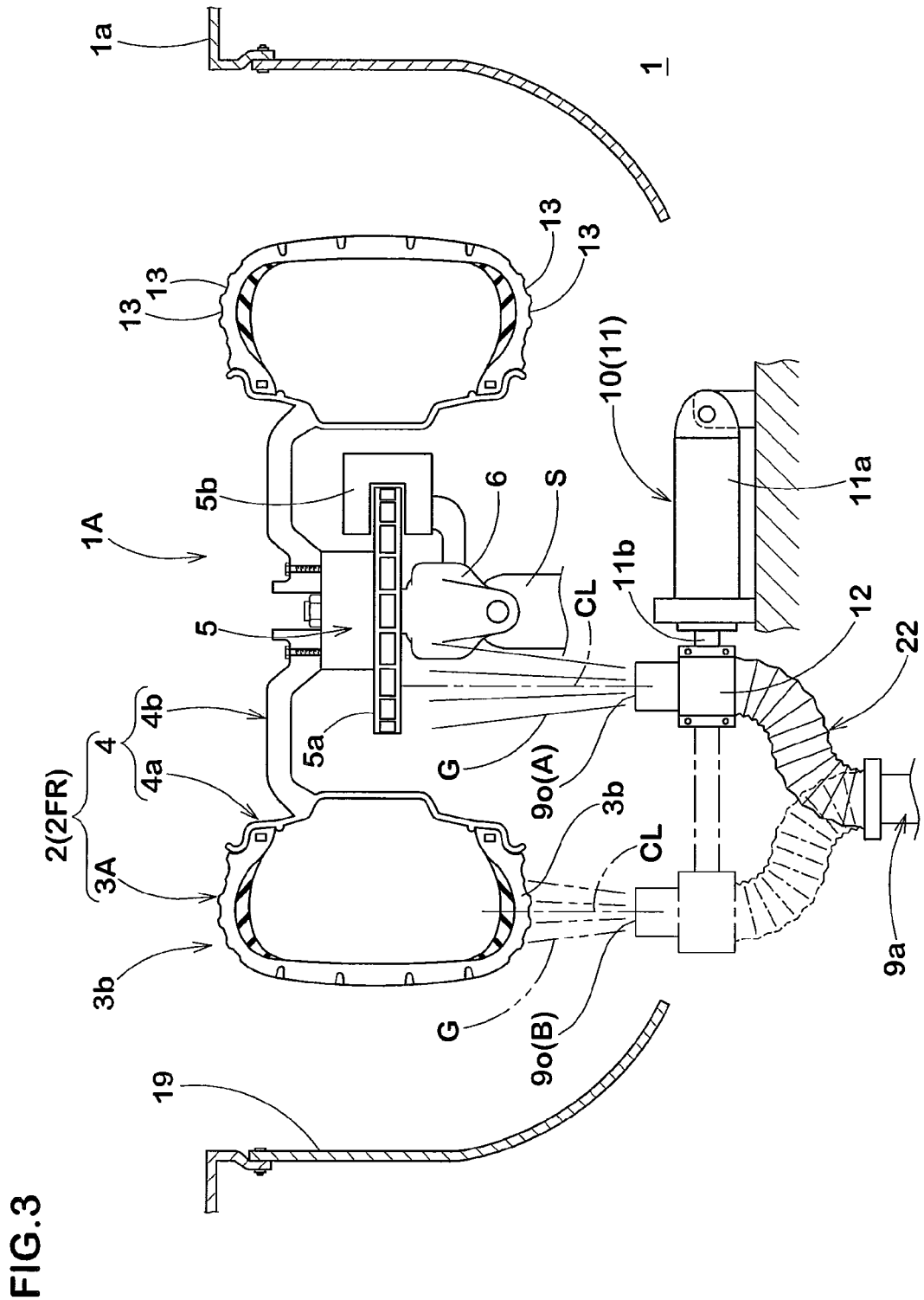
FIG. 3 is a cross sectional view taken along the line A-A in FIG. 2.

FIG. 2 is a side view of the front right wheel 2FR as a representative tire, and FIG. 3 is a plan view thereof. Each wheel 2 includes a pneumatic tire 3A and a wheel rim 4 around which the pneumatic tire 3A is assembled.

Figure 4:
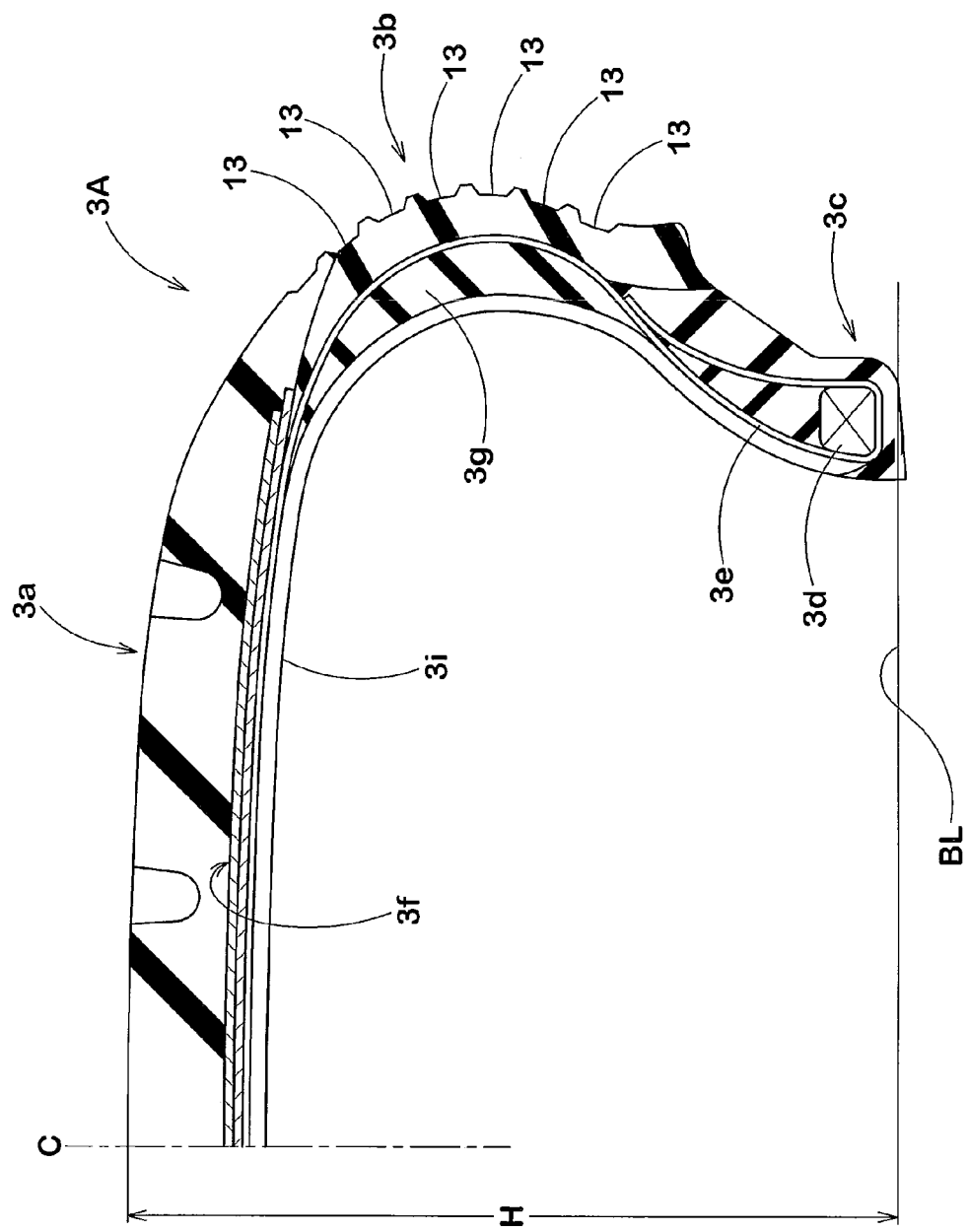
FIG. 4 is a cross sectional view of a pneumatic tire used for the vehicle of the first aspect of the invention.

As shown in FIG. 4 in a close-up manner, the pneumatic tire 3A includes a tread 3a which comes into contact with a road surface, a pair of sidewalls 3b extending radially inward of the tire from both ends of the tread 3a, beads 3c connected to the respective sidewalls 3b and placed on the wheel rim 4, and carcasses 3e made of carcass plies which are organic fiber cords. Both ends of the carcasses 3e are folded-back at non-expansible bead cores 3d embedded in the beads 3c. The pneumatic tire 3A also includes a metal cord belt layer 3f disposed outside of the carcass 3e and inside of the tread 3a.

The pneumatic tire 3A of the embodiment is a run flat tire in which a side-reinforcing rubber layer 3g having a substantially crescentic cross section is disposed in each of the sidewalls 3b inside the carcass 3e. A relatively hard rubber composition is used as material of the side-reinforcing rubber layer 3g to prevent the riding comfort at the time of normal running from being largely deteriorated, to enhance the bending rigidity of the sidewall 3b and to suppress the vertical bending of the tire at the time of the run flat running. JIS durometer A hardness of the side-reinforcing rubber layer 3g is preferably 60° or more and more preferably 65° or more, and its upper limit is preferably 95° or less, and more preferably 90° or less. An excellent air non-permeable inner linear is disposed on a cavity surface 3i of the tire.

According to the run flat tire, even when it blows, the vehicle can not immediately be brought into a running-disability state, and the vehicle can run a certain distance (e.g., about 50 to 100 km) to a safety parking area such as a nearest gas station at a high speed of 80 km/h, for example. However, for the vehicle 1A of the present invention, the run flat tire is not an indispensable configuration requirement.

Many dimples 13 are formed in outside surfaces of at least one of the sidewalls 3b (both of the sidewalls 3b in the embodiment) of the pneumatic tire 3A.

As a matter of convenience, the outside surface of the sidewall 3b is defined as a region that can visually be seen when the tire 3 mounted around the wheel rim 4 is seen from its axial direction.

The "dimples" are clearly distinguished from "grooves". Since the groove has a long length with respect to its width as viewed from above, air is prone to stay inside. On the other hand, a dimple has a small ratio of a long diameter to a short diameter as viewed from above, and there is a merit that air is less prone to stay unlike the groove. Residence of air deteriorates the heat dissipation of the tire. Here, the "long diameter" is a length of the longest line segment which can be depicted within a contour when the dimple is seen from infinity, and the "short diameter" is a length of a line segment in a direction intersecting with the longest line segment.

Although the ratio of the long diameter to the short diameter of the dimple 13 is not especially limited, it is preferable that the ratio is 3.0 or less, especially 2.0 or less, and more preferably 1.5 or less. If the dimple has a circular shape as viewed from above, this ratio is 1.0.

Figure 5:
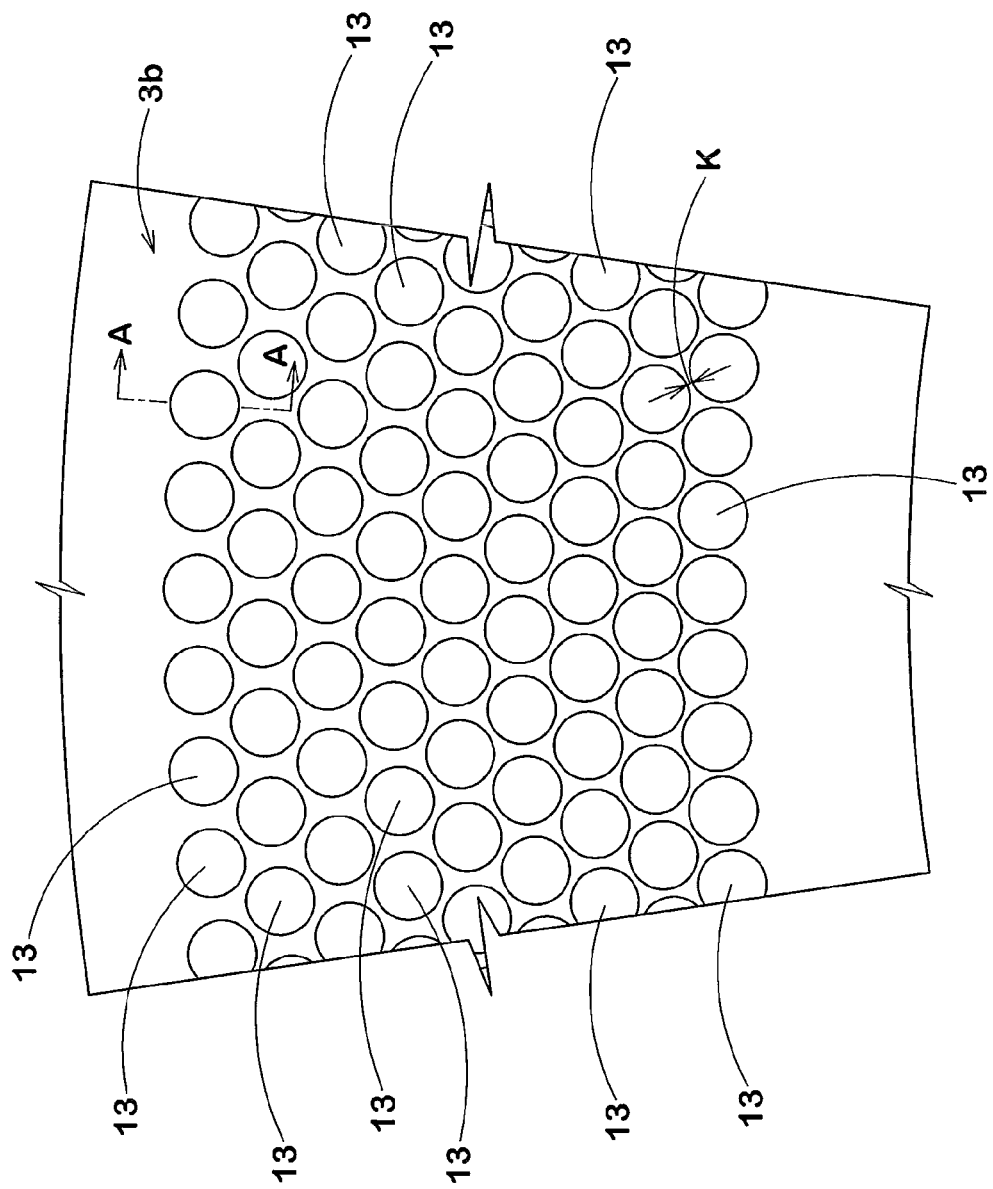
FIG. 5 is an enlarged partial side view of a sidewall of the tire.
Figure 6:
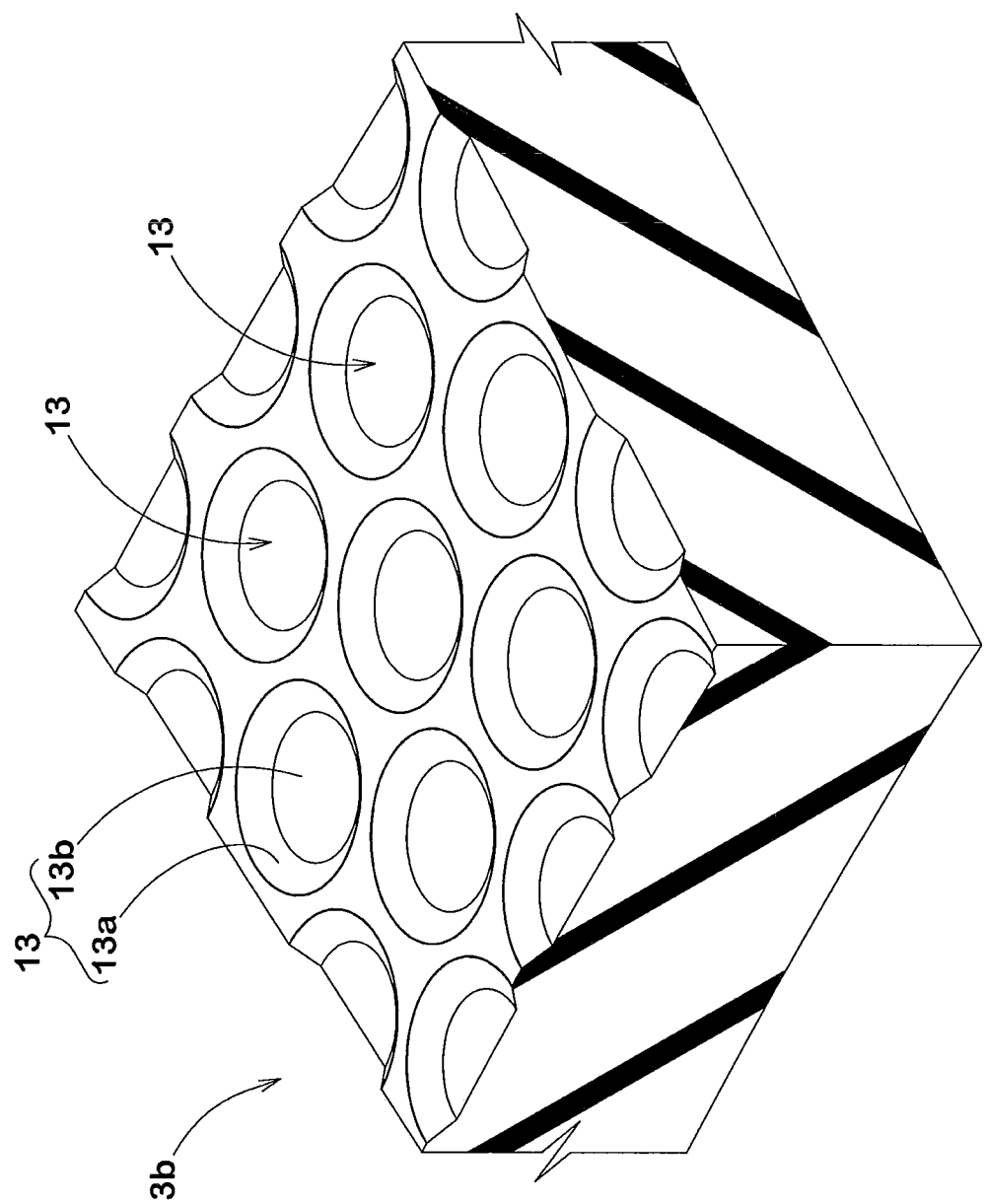
FIG. 6 is a partial perspective view of dimples of the sidewall.
Figure 7:
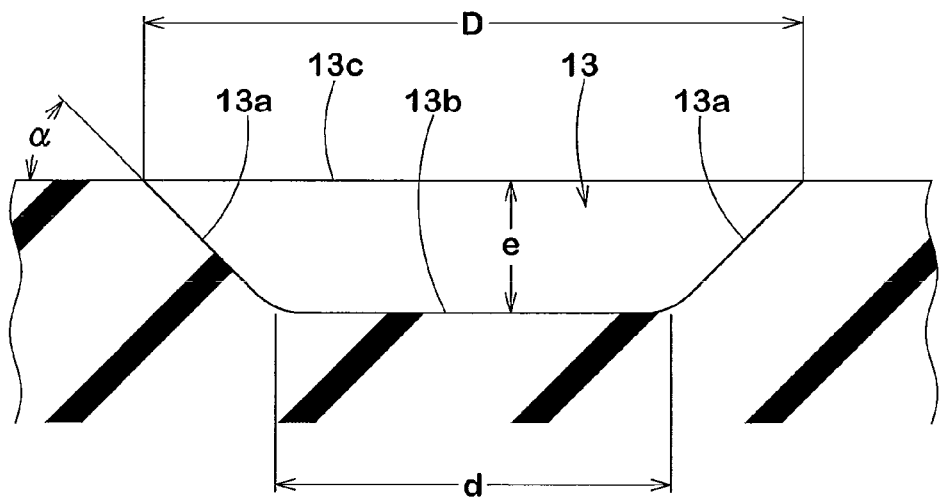
FIG. 7 is a cross sectional view taken along the line A-A in FIG. 5.

FIG. 5 is an enlarged side view in which the sidewall 3b of the tire 3 in FIG. 4 is developed on a plane. FIG. 6 is a partial perspective view thereof. FIG. 7 is a cross sectional view taken along the line A-A in FIG. 5 (cross sectional view passing through a center of the dimple). Each of the dimples 13 of the embodiment has a circular surface shape. The surface shape of the dimple 13 means a contour shape of the dimple when seen from infinity.

As apparent from FIGS. 6 and 7, the dimple 13 is recessed inward of the tire. According to this, a surface area of the sidewall 3b becomes larger than that when there are no dimples 13. The dimples 13 increase a contact area between the tire 3 and air, and heat dissipation is promoted.

As shown in FIG. 7, each of the dimples 13 of the embodiment includes a ring-like slope surface 13a and a substantially flat circular bottom surface 13b which is connected to an inner end of the slope surface 13a.

Figure 8:
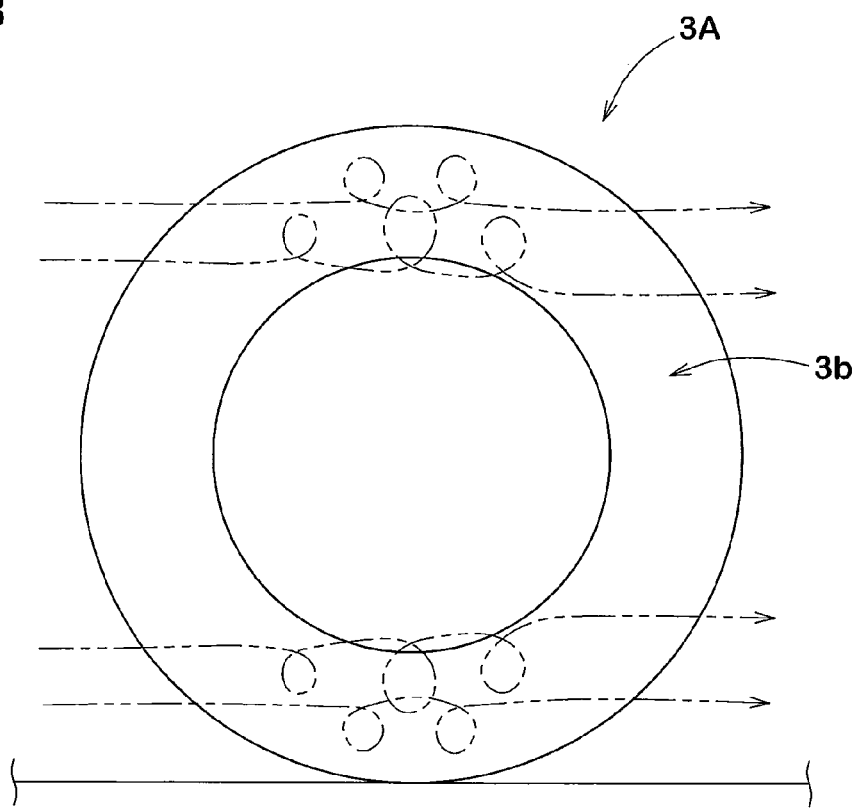
FIG. 8 is a side view of the pneumatic tire for explaining a flow of air passing through the dimples.

FIG. 8 is a side view of the tire 3, and chain double-dashed lines in FIG. 8 show flows of air around the tire 3. When tires 3 rotate and the vehicle runs, air flows across the dimples 13. A portion of the air flows into the dimples 13 along the slope surfaces 13a. When air flows into the dimple 13, a swirl is generated in the flow. In other words, a turbulent flow is generated at an inlet of the dimple 13. This turbulent flow effectively promotes discharge of heat of the sidewall 3b to the atmosphere. Therefore, breakage of a rubber member of the tire and damage such as exfoliation between the rubber members caused by heat can be suppressed for along term.

Air which formed a swirl flows along the slope surface 13a and the bottom surface 13b in the dimple 13. This air smoothly flows out from the dimple 13. Therefore, according to the tire 3 having the dimples 13 formed in the sidewalls 3b, air is less prone to stay and the tire 3 is superior in a heat dissipation effect as compared with a conventional tire having projections on the sidewalls.

Although a size of the dimple 13 is not especially limited, it is preferable that a diameter D of the dimple 13 is 2 mm or more, more preferably 4 mm or more, still more preferably 6 mm or more, and most preferably 8 mm or more. Sufficient air flows into such a dimple 13 and the turbulent flow can be generated. In contrast, if the diameter D of the dimple 13 becomes excessively large, the number of dimples is limited. Therefore, its upper limit is preferably 70 mm or less, more preferably 50 mm or less, still more preferably 40 mm or less, and still more preferably 30 mm or less, and most preferably 18 mm or less. A diameter of a non-circular dimple is obtained as a diameter of a circular dimple having the same area as that of this non-circular dimple. The dimples 13 may have two or more kinds of dimples having different diameters. In this case, it is preferable that an average diameter of the dimples is within the above-described range.

A depth e of the dimple 13 is a shortest distance between the deepest portion of the dimple 13 and a straight line 13c which connects upper edges of the slope surface 13a of the dimple 13, and the depth e is 0.1 mm or more, preferably 0.2 mm or more, more preferably 0.3 mm or more, still more preferably 0.5 mm or more, especially preferably 0.7 mm or more, and most preferably 1.0 mm or more. According to this, it is possible to provide dimples 13 which increase the surface area and enhance the heat dissipation performance. In view of a rubber thickness of the sidewall 3b, the depth e of the dimple 13 is preferably 4 mm or less, more preferably 3.0 mm or less, still more preferably 2.0 mm or less. The dimples 13 may include two or more kinds of dimples having different depths.

A ratio (e/D) of the diameter D to the depth e of the dimple 13 is preferably 0.01 or more and 0.5 or less. Such a dimple 13 generates a sufficient turbulent flow. TO further enhance such an effect, the ratio (e/D) is preferably 0.03 or more, and more preferably 0.05 or more, its upper limit is preferably 0.4 or less, and more preferably 0.3 or less.

As shown in FIG. 7, each of the dimples 13 has a substantially trapezoidal cross section. In other words, the shape of the dimple 13 is circular truncated cone. The dimple 13 has a large capacity despite the depth e. Therefore, both a sufficient capacity and a small depth e are realized. Since the small depth e is set, it is possible to secure sufficient thickness of a rubber which covers the outside surface of the sidewall 3b such as a sidewall rubber.

In FIG. 7, a symbol α represents an angle of the slope surface 13a. This angle α is preferably 10° or more and 70° or less. If the dimples 13 have the angles α in this range, both a sufficient capacity and a small depth e are satisfied, and it is possible to prevent air from staying and secure a smooth flow of air. From this viewpoint, the angle α is more preferably 20° or more, still more preferably 25° or more, and its upper limit is preferably 60° or less, and more preferably 55° or less.

In FIG. 7, a symbol d represents a diameter of the bottom surface 13b. A ratio (d/D) of the diameter d of the bottom surface 13b to the diameter D of the dimple 13 is preferably 0.40 or more and 0.95 or less. If the dimples 13 have such a ratio (d/D), both a sufficient capacity and a small depth e are satisfied. From this viewpoint, the ratio (d/D) is preferably 0.55 or more, more preferably 0.65 or more, and its upper limit is preferably 0.85 or less, and more preferably 0.80 or less.

The capacity of the dimple 13 is preferably 1.0 mm$^3$ or more and 400 mm$^3$ or less. Such a dimple 13 can generate a sufficient turbulent flow. To enhance this effect, the capacity is preferably 1.5 mm$^3$ or more, more preferably 2.0 mm$^3$ or more, and its upper limit is preferably 300 mm$^3$ or less, and more preferably 250 mm$^3$ or less.

Total capacities of all of the dimples 13 are preferably 300 mm$^3$ or more and 5,000,000 mm$^3$ or less. A tire 3 having the total capacities of 300 mm$^3$ or more can exert sufficient heat dissipation performance. To further enhance this effect, the total capacities are preferably 600 mm$^3$ or more, more preferably 800 mm$^3$ or more, and its upper limit is preferably 1,000,000 mm$^3$ or less, and more preferably 500,000 mm$^3$ or less.

An area of the dimple 13 is preferably 3 mm$^2$ or more and 4,000 mm$^2$ or less. Such a dimple 13 can generate a sufficient turbulent flow. To further enhance this effect, the area is preferably 12 mm$^2$ or more, especially preferably 20 mm$^2$ or more, and its upper limit is preferably 2,000 mm$^2$ or less, and more preferably 1,300 mm$^2$ or less. In this specification, the area of the dimple 13 means an area surrounded by the contour of the dimple 13, and when the dimple 13 is circular in shape as in this embodiment, the area is calculated by the following equation:

$$S(\text{area}) = (D/2)^2 \times \pi$$

occupancy of the dimples 13 is preferably 10% or more and 85% or less. In this specification, the occupancy Y of the dimples 13 is calculated by the following equation:

$$Y(\%) = (S1/S2) \times 100$$

In the above equation, "S1" represents an area of dimples 13 included in a reference region, and "S2" represents a surface area of the reference region on the assumption that there are no dimples 13. The reference region is an essential region of an outside surface of the sidewall 3b, and is a region of 20% or more and 80% or less of a height H of a tire cross section as measured from a bead base line BL. If the occupancy Y of the dimples 13 in the outside surface of the sidewall 3b is set to 10% or more, sufficient heat dissipation performance can be secured. To further enhance this effect, the occupancy Y is preferably 30% or more, more preferably 40% or more, and its upper limit is preferably 80% or less, and more preferably 75% or less.

As shown in FIG. 5, a minimum distance K between adjacent dimples 13 is preferably 0.05 mm or more and 20 mm or less. If the distance K becomes short, there is a fear that a resistance to traumatic damage of the sidewall rubber which constitutes the outside surface of the sidewall 3b is deteriorated, and if the distance K becomes long, the heat dissipation effect is relatively lowered. From this viewpoint, the distance K is more preferably 0.10 mm or more, still more preferably 0.20 mm or more, and its upper limit is preferably 15 mm or less, and more preferably 10 mm or less.

The total number of the dimples 13 is preferably 50 or more and 5,000 or less. According to this, sufficient heat dissipation performance and the resistance to traumatic damage of the sidewall rubber are secured. Especially, the total number is more preferably 100 or more, still more preferably 150 or more, and its upper limit is preferably 2,000 or less, and more preferably 1,000 or less. This total number of the dimples is the number of dimples on one sidewall.

All of the dimples 13 need not be circular in shape, and the dimples 13 may include circular dimples and non-circular dimples, or all of the dimples 13 may be non-circular dimples. Examples of shapes of the typical non-circular dimples as viewed from above are a polygonal shape, an elliptic shape, a long elliptic shape and/or a tear drop shape. Since the tire 3 rotates, a flowing direction of air with respect to the dimples 13 provided on the sidewall 3b thereof is not constant. Therefore, it is most preferable that the tire 3 has dimples 13 having no directional property, i.e., dimples 13 having circular shapes as viewed from above as in the embodiment.

As well shown in FIG. 5, in the tire 3 of the embodiment, a large number of dimples 13 are disposed in multistage and multiple row in zigzag manner in a circumferential direction and radial direction of the tire. This arrangement is continued in the circumferential direction of the tire. Therefore, six dimples 13 are adjacent to each other around one dimple 13 to surround the one dimple 13. According to the arrangement of the dimples, generation locations of the turbulent flow are distributed uniformly, heat of the outside surface of the sidewall 3b is uniformly released, and an excellent tire cooling effect is exerted. The large number of dimples 13 may be arranged at random.

Figure 9A:
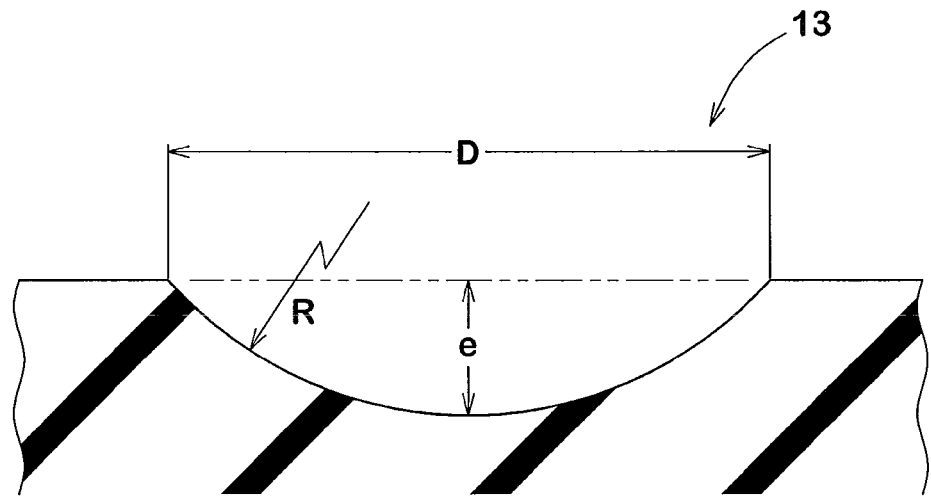
FIGS. 9(a) and (b) are cross sectional views showing another embodiment of the dimples.

FIG. 9 are cross sectional views of dimples 13 of another embodiment. The dimple shown in FIG. 9(a) is circular in shape, and its cross section shape is arc to configure a portion of a sphere having a radius R. To smoothen a flow of air passing through the dimple 13, the radius R is preferably 3 mm or more and 200 mm or less.

Figure 9B:
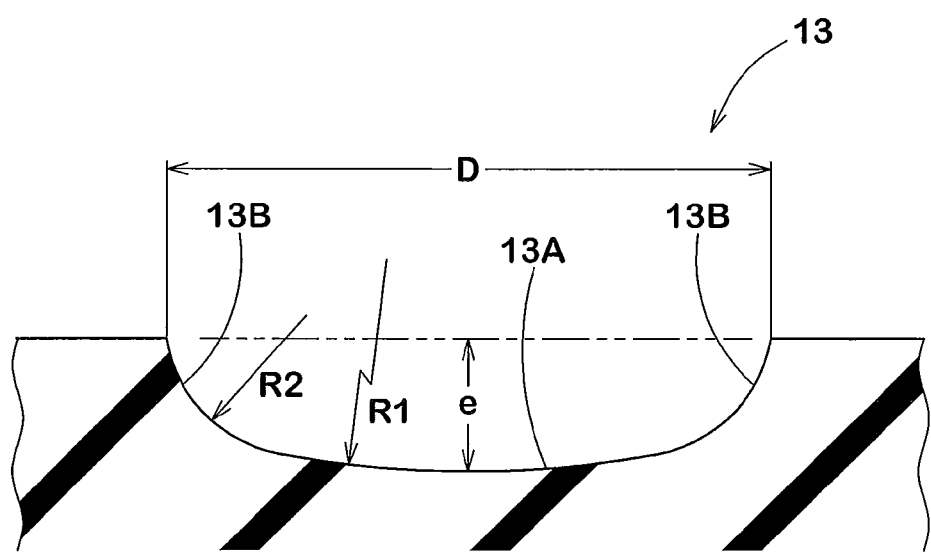

FIG. 9(b) also shows a circular dimple 13, and its cross section shape includes a first curved surface 13A having a radius of curvature R1, and second curved surfaces 13B having radius of curvature R2 which are continuously provided on both sides of the first curved surface 13A. The first curved surface 13A and the second curved surface 13B are smoothly connected to each other, and this is a dimple of a so-called double radius type. A ratio (R1/R2) between the radius of curvature R1 and the radius of curvature R2 is not especially limited, but to smoothen the flow of air passing through the dimple 13, the radio (R1/R2) is preferably 0.1 or more and 0.8 or less. If the ratio (R1/R2) of the dimple 13 is 0.1 or more, air smoothly flows. From this viewpoint, the ratio (R1/R2) is more preferably 0.2 or more, still more preferably 0.3 or more, and its upper limit is preferably 0.7 or less, and more preferably 0.6 or less.

As shown in FIG. 3, the wheel rim 4 includes a substantially cylindrical rim portion 4a on which the pneumatic tire 3A is mounted, and a disk portion 4b which is integrally fixed to or formed on the rim portion 4a. The disk portion 4b is fixed to a hub (not shown) through a brake device 5. The brake device 5 includes a brake rotor 5a and a caliper 5b having a brake pad. The hub is mounted on a knuckle 6 through a bearing or the like. The knuckle 6 is vertically movably and turnably provided on the vehicle body 1a through a suspension device S.

As shown in FIG. 1, the vehicle 1A is provided with an air-pressure monitoring device 7 which monitors an air pressure in each wheel 2. As the air-pressure monitoring device 7, a direct type device and an indirect type device are known.

In the case of the direct type air-pressure monitoring device 7, a pressure sensor which detects an air pressure in a tire is assembled into each wheel 2. The pressure sensor is configured integrally with an air valve in some cases. An electric signal which corresponds to the air pressure detected by the pressure sensor is sent to a control device 14 (described later) on the side of the vehicle body by a signal line through a radio or slip ring.

A sensor which detects a rotation speed of each wheel 2 is used for the indirect type air-pressure monitoring device 7. An output signal of the sensor is input to the control device 14 such as a microcomputer. By carrying out a predetermined calculation using this signal, a wheel 2 whose air pressure was reduced is specified. That is, one of four wheels 2 whose air pressure was reduced is specified from the rotation speed ratio utilizing a fact that in the indirect type air-pressure monitoring device 7, if an air pressure in the pneumatic tire 3A is reduced, its dynamic rotation radius becomes small (a rotation speed is increased as compared with other wheels having normal air pressures) (see Japanese Patent No. 4028848 and the like).

The indirect type air-pressure monitoring device has a simple structure, but has a problem of detection precision and a problem that if air pressures of all of the four wheels are reduced, the reduction in air pressure cannot be detected. On the other hand, the direct type air-pressure monitoring device does not have the demerit of the indirect type air-pressure monitoring device 7, but there is a fear that the device cost is increased. Therefore, it is preferable to use the device properly in accordance with circumstances.

The vehicle 1A is provided with a cooling device 8 which blows gas G for cooling the pneumatic tire 3A from outside. In this embodiment, the cooling device 8 is configured such that when an air pressure in the pneumatic tire 3A is reduced, the cooling device 8 is operated. According to the vehicle 1A of the embodiment, gas G blows, from outside, to a tire 3 which runs in a state where the air pressure is reduced and which is prone to generate heat, thereby drawing heat and cooling the tire 3. Further, since the dimples 13 are formed in the outside surface of the sidewall 3b of the tire 3, the durability of the tire 3 is critically enhanced by a synergetic effect with the cooling device 8.

Therefore, in the vehicle of the embodiment, it is possible to suppress the heat generation of the pneumatic tire 3A which runs under a low air pressure, and to enhance the durability significantly without excessively increasing a vertical spring constant of the tire 3 (i.e., without extremely deteriorating the riding comfort). When the pneumatic tire 3A is a run flat tire as in this embodiment, it is possible to remarkably increase a run flat continuous running distance and/or a run flat running speed.

More specifically, as shown in FIG. 1, the cooling device 8 of the embodiment has a duct 9. The duct 9 is provided at its one end with an air induction port 9i through which air is taken, and at its other end with issuing ports 9o through which the air blows. The cooling device 8 also includes a changeover tool 10 which blows at least a portion of air flowing through the duct 9 to the pneumatic tire 3A when the air pressure in the pneumatic tire 3A is reduced. The cooling device 8 also includes a control device 14 which controls the changeover tool 10 and the like.

As shown in FIG. 1, the air induction port 9i of the duct 9 is provided in a front grill or a hood bulge (both not shown) of the vehicle 1A such that the air induction port 9i opens at a front location. According to this, it is possible to naturally take air into the air induction port 9i by running of the vehicle without driving a fan or the like. There is no problem even if the fan is driven. It is preferable that the air induction port 9i is provided with an air filter f or the like to prevent a foreign matter from entering the duct 9.

The duct 9 of the embodiment branches off into four pipes at locations downstream of the air induction port 9i, and branch pipes 9a to 9d extend to locations in the vicinity of the four wheels 2. The issuing ports 9o through which air introduced by the duct 9 blows are provided on most downstream side of the branch pipes 9a to 9d. In this embodiment, as shown in FIG. 3, portions of the branch pipes 9a to 9d in the vicinity of the issuing port are configured as flexible portions 22 which can bend and deform.

As shown in FIGS. 2 and 3, the changeover tool 10 of the embodiment includes a straightly moving type actuator 11. Various types of actuators can be employed as the actuator 11 such as an actuator utilizing a fluid pressure, and an actuator which converts rotating motion of a motor into straight motion to be utilized.

The actuator 11 includes a cylindrical body 11a which is fixed to a chassis of the vehicle body 1a so that the actuator 11 does not interfere with a wheel house cover 19 and the suspension device S. The actuator 11 also includes a rod 11b which can project from and retract into the body 11a. In this embodiment, the actuator 11 is mounted such that the rod 11b moves in a longitudinal direction of the vehicle body 1a. A concrete mounting manner can variously be modified of course. A tip end of the rod 11b is fixed to a portion of the duct 9 in the vicinity of the issuing port 9o through a connecting tool 12.

The actuator 11 is in a position where its rod 11b retracts as its initial state. At that time, the issuing port 9o of the duct 9 is disposed at a position A directed to the brake device. More specifically, the issuing port 9o is disposed such that a center axis CL of the issuing port 9o intersects with a rotor surface of the brake rotor 5a of the brake device 5 (substantially at right angle in the embodiment).

on the other hand, as shown with a phantom line in FIG. 3, if the rod 11b of the actuator 11 is extended, it is possible to move the issuing port 9o of the duct 9 and to dispose the issuing port 9o at a position B directed to the pneumatic tire 3A. More specifically, the center axis CL of the issuing port 9o is disposed such that it intersects with the inner sidewall 3b of the pneumatic tire 3A. That is, air blows out from the issuing port 9o of the cooling device 8 toward the dimples 13 of the sidewall 3b.

when the vehicle runs under a low air pressure or the vehicle runs in the run flat running manner, there is a tendency that a portion of the tire 3 located on an inner side of the vehicle as compared with a tire equator C generates more heat due to influence of a general wheel alignment. Therefore, it is preferable that the issuing port 9o blows air to the portion of the pneumatic tire 3A located on the inner side of the vehicle as compared with the tire equator C and toward the dimples 13.

It is also possible to provide the issuing port 9o in an upper portion of the pneumatic tire 3A and to blow air to the tread 3a. A plurality of issuing ports 9o may be provided in each branch pipe, and air may blow to the tread 3a and the sidewall 3b at the same time to more efficiently cool the pneumatic tire 3A.

As shown in FIG. 1, a detection signal of the air-pressure monitoring device 7 provided in each wheel 2 is input to the control device 14. The control device 14 determines and specifies, as a low air pressure tire or a flat tire, a pneumatic tire 3A whose air pressure becomes lower than a predetermined value based on the input detection signal, the control device 14 controls the changeover tool 10 for that tire, and can blow out at least a portion of the air in the duct 9 toward the pneumatic tire 3A.

The effect of the cooling device 8 of the embodiment having the above-described configuration will be described.

First, when the wheels 2 of the vehicle 1A normally run under an appropriate air pressure P2, it is contemplated that the heat generated in the tire 3 does not have an effect on the durability. Therefore, in this state, the control device 14 does not especially changes over the changeover tool 10. Therefore, air taken from the air induction port 9i of the duct 9 blows to the brake devices 5 of the wheels 2 through the branch pipes 9a to 9d. According to this, the brake devices 5 are cooled and their braking effects are enhanced.

Next, when the front right wheel 2FR runs on a nail and the air pressure in the pneumatic tire 3A of the front right wheel 2FR is reduced to an air pressure P1 for example, the control device 14 determines that the air pressure in the pneumatic tire 3A of the front right wheel 2FR becomes lower than a predetermined air pressure based on the detection signal from the air-pressure monitoring device 7, and the control device 14 outputs a driving signal to the changeover tool 10 and extends the rod 11b. According to this, as shown with a phantom line in FIG. 3, the issuing port 9o of the branch pipe 9a is changed over to the position B directed to the sidewall 3b of the pneumatic tire 3A. Therefore, during running of the vehicle 1A, it is possible to blow the entire air flowing through the branch pipe 9a to the sidewall 3b of the pneumatic tire 3A having the low air pressure provided with the dimples 13.

Therefore, according to the cooling device 8 of the embodiment, at the time of normal running of the vehicle in which the air pressure in the pneumatic tire 3A is not reduced, air flowing through the duct 9 blows toward the brake device 5 provided in each wheel 2, thereby enhancing the braking effect. On the other hand, when the air pressure in the pneumatic tire 3A is reduced, air flowing through the duct 9 blows toward the pneumatic tire 3A to cool the tire, thereby retarding the temperature rise. For a wheel having a pneumatic tire 3A filled with a normal air pressure, air blows to the brake device as in the past. Hence, it is possible to continuously prevent the excessive heat of the brake device 5.

It is preferable that when the tire is a run flat tire, the air pressure P1 by which the cooling device 8 is operated is set to a blowout state in which the heat generation is most serious. When the tire is non-run flat tire on the other hand, the air pressure P1 can be set to an air pressure (about 50% of a normal internal pressure set by specifications) lower than the normal internal pressure (for example, "a maximum air pressure" specified in JATMA, a maximum value described in a Table "TIRE LOAD LIMITS AT VARIOUS COLD INFLATION PRESSURES" in TRA, and "INFLATION PRESSURE" in ETRTO).

In this embodiment, air is used as the gas G, but if the gas G can cool the pneumatic tire 3A, various kinds of gases can be employed in addition to air. For example, it is also possible to provide, in the vehicle 1A, a gas cylinder in which gas other than air is accommodated, and to blow the gas G to the pneumatic tire 3A having a low air pressure.

To cool the pneumatic tire 3A during running, it is necessary that a temperature of the gas G is lower than that of the tire, especially lower than that of the tread 3a or the sidewall 3b. In view of such circumstances, it is preferable that the gas G is blown, toward the pneumatic tire 3A, at the temperature of 60° C. or less, more preferably 50° C. or less, and more preferably 40° C. or less. As shown in FIG. 1, to lower the air temperature, a heat exchanger 20 such as an intercooler may be included in somewhere in the duct 9.

Although the changeover tool 10 is immediately changed over and air blows to the pneumatic tire 3A when the air pressure in the pneumatic tire 3A is reduced to P1 in this embodiment, the present invention is not limited to the embodiment. It is also possible to output a driving signal of the changeover tool 10 when predetermined time is elapsed after air pressure in the pneumatic tire 3A is reduced to P1. According to this configuration, air is discharged to the pneumatic tire 3A after the tire sufficiently generated heat, and it is possible to cool the brake device 5 up to the very last minutes.

Figure 10:
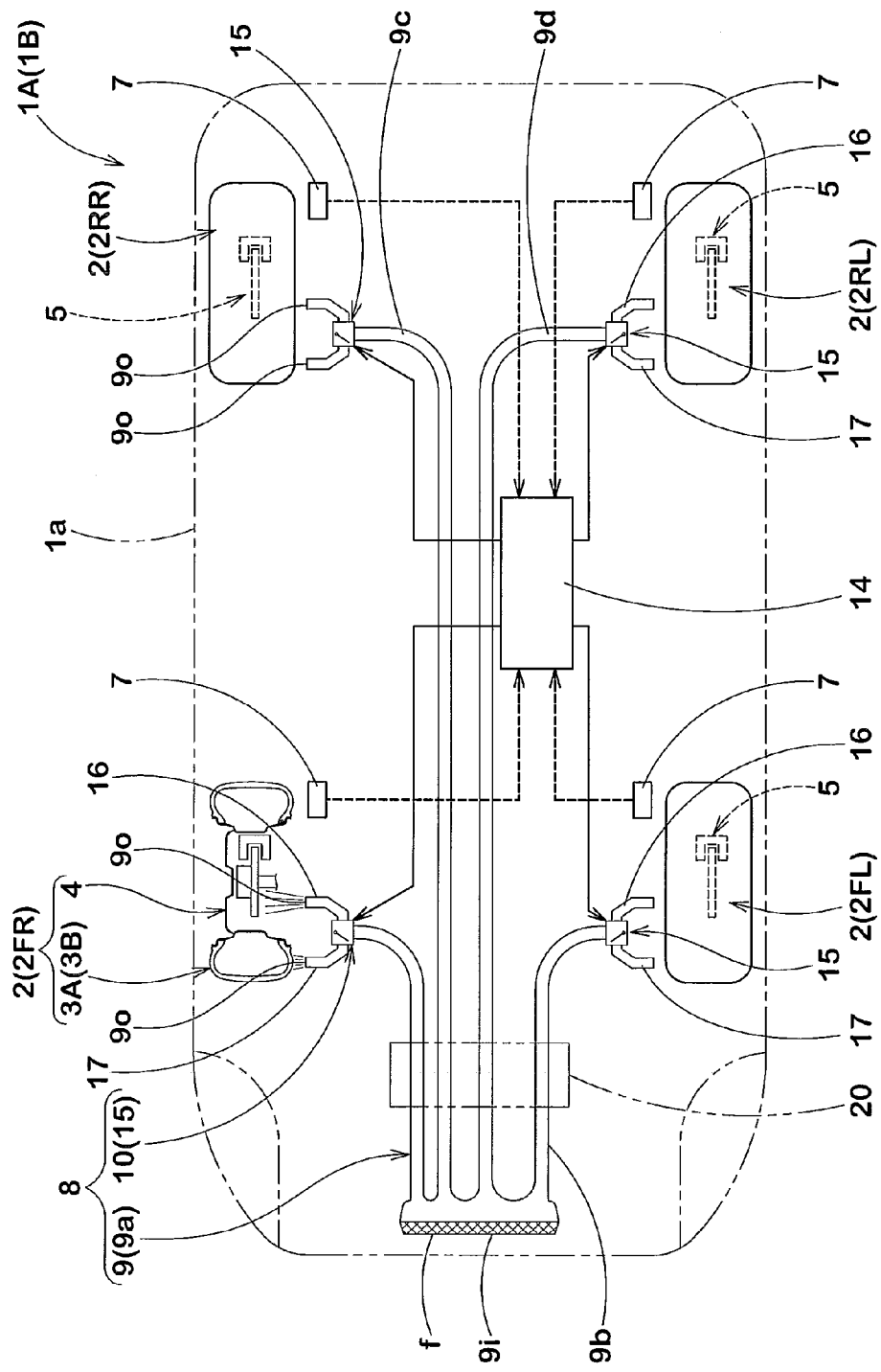
FIG. 10 is a schematic plan view showing another embodiment of the vehicle of the first aspect of the invention.
Figure 11:
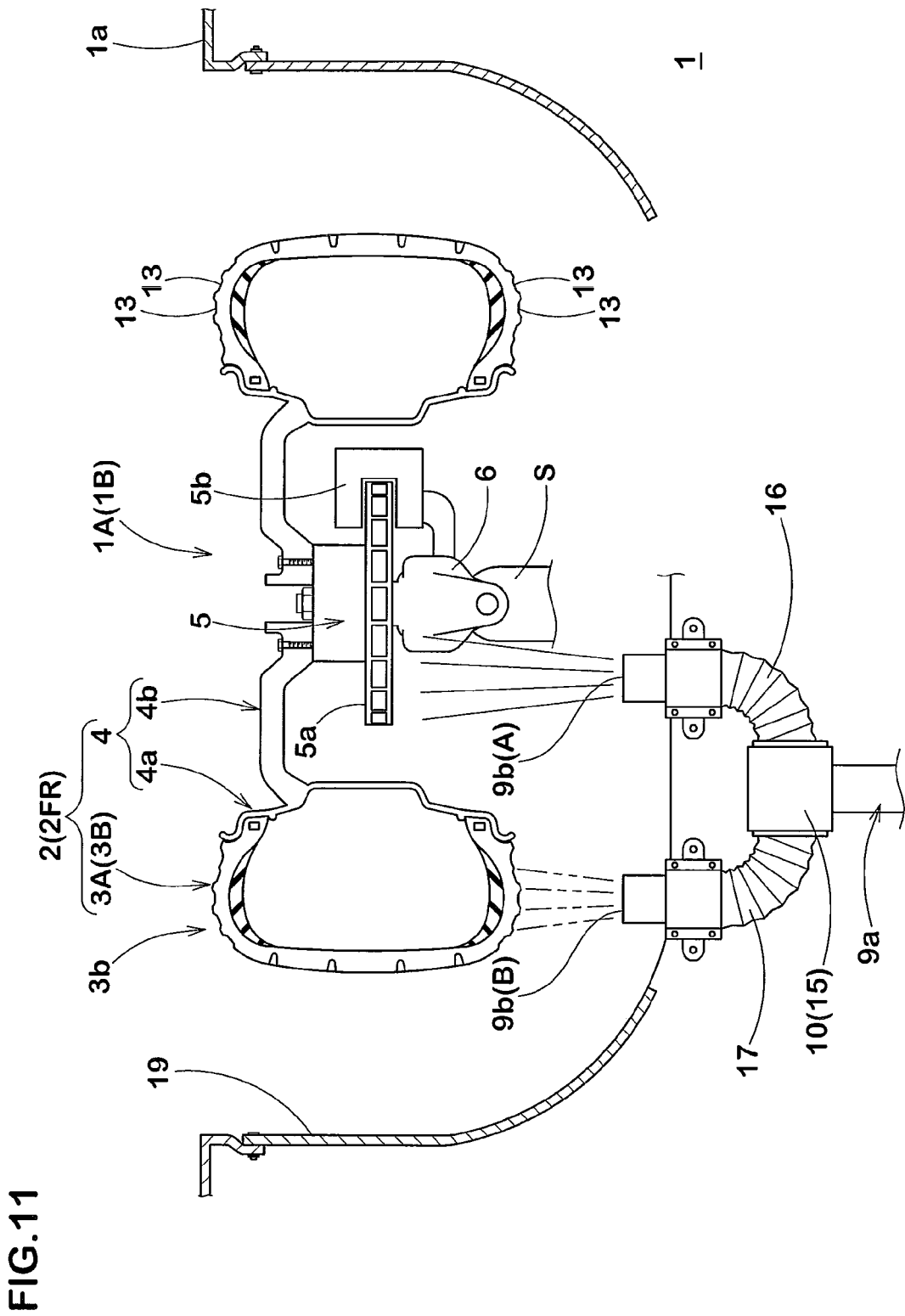
FIG. 11 is an enlarged view of an essential portion of a front right wheel and its periphery.

FIGS. 10 and 11 show another embodiment of the vehicle 1A of the first aspect of the invention.

In this embodiment, changeover valves 15 as the changeover tool 10 are connected to locations downstream of the branch pipes 9a to 9d of the duct 9. A first branch pipe 16 having an issuing port 9o located at the position A directed to the brake device, and the second branch pipe 17 having an issuing port 9o located at a position B directed to the sidewall 3b of the pneumatic tire 3A are connected to each of the changeover valves 15. The changeover valve 15 is a solenoid valve, and can discharge air flowing through the duct 9 to the first branch pipe 16 or the second branch pipe 17 in a changing over manner by the control device 14.

According to the cooling device 8 of the embodiment, at the time of the normal running in which an air pressure in the pneumatic tire 3A is not reduced, the control device 14 changes over the changeover valve 15 so that the air in the duct 9 flows through the first branch pipe 16. According to this, it is possible to blow air flowing through the duct 9 toward the brake device 5 provided in each of the wheels 2, and the braking effect can be enhanced.

on the other hand, when the air pressure in one of the pneumatic tires 3A is reduced, the control device 14 outputs a valve changing over signal to the changeover valve 15 of the wheel 2 whose air pressure was reduced, and the changeover valve 15 is changed over so that air in the duct 9 flows to the second branch pipe 17. According to this, the air flowing through the duct 9 blows toward the sidewall 3b of the pneumatic tire 3A provided with the dimples 13 and eventually, it is possible to cool the pneumatic tire 3A at the time of low air pressure running.

A valve which can supply air to both the first branch pipe 16 and the second branch pipe 17 and which can change a discharging ratio to the pipes 16 and 17 may be employed as the changeover valve 15. According to such a configuration, 80% air in the duct 9 can blow to the pneumatic tire 3A and 20% air can blow to the brake device, for example, and it is possible to prevent heat from being generated in both the pneumatic tire 3A and the brake device 5 in accordance with a situation.

Although the embodiments of the vehicle 1A of the first aspect of the invention have been described above, the invention is not limited to the embodiments and the invention can variously be modified and carried out. As other modifications, at least the following modifications are included in the present invention.

[Modification 1]

According to the above embodiments, the cooling device 8 also cools the brake device. Alternatively, the cooling device 8 can also blow a portion of air toward an in-car heat generating device such as a turbine of a supercharger and a radiator instead of the brake device.

[Modification 2]

According to the above embodiments, all of the wheels 2 are provided with the issuing ports 9o which can discharge gas G. In the case of a Front-engine Front-drive vehicle, the cooling devices 8 may be provided only in the front wheels which are driving wheels having large axle weights and whose piping operations are easy.

[Modification 3]

According to the above embodiments, the control device 14 automatically controls the blowing operation of air toward the pneumatic tire 3A. Alternatively, an operation switch (not shown) for driving the cooling device may be provided on a driver's seat, and a signal of the operation switch may be input to the control device 14. According to this configuration, it is possible to forcibly and manually blow air to any of the tires by a remote operation from the driver's seat.

[Modification 4]

The cooling device 8 can blow gas for cooling the pneumatic tire 3A from outside even before an air pressure in the pneumatic tire 3A is reduced. In this case also, since the generation of heat of the tire is suppressed, the energy loss is reduced and a rolling resistance is reduced. Hence, fuel economy of the vehicle 1A can be enhanced.

EXAMPLE A

To confirm the effect of the first aspect of the invention, a run flat running test was carried out using the following vehicles. The vehicles have substantially the same specifications other than those described in Tables. Specifications of the vehicles are as follows:

Displacement: Japanese rear-wheel drive vehicle of 4,300 cc

Tire size (all wheels): run flat tire of 245/40R18

Specifications of dimples: as described in Table 1

Front wheel load: 5.29 kN

Rear wheel load: 5.39 kN

Front wheel camber angle: 1° (negative)

The vehicles were provided with cooling devices.

In the run flat running test, a front right wheel was a flat tire having a zero air pressure (air pressures of other three tires were 230 kPa), the vehicles were made to continuously run on a high speed running test course of a dry asphalt road (weather: fine weather, temperature of 24° C.) at an average running speed of 80 km/h, and a run flat running distance until the tire was destroyed was checked. In each of the vehicles of the examples, the cooling device was always operated during the test running, and air blew to a sidewall of the flat tire on an inner side of the vehicle at an average wind speed of about 50.4 km/h. Performance tests were carried out also for a comparative example 1A (no dimples were provided, and the cooling device was not operated), a comparative example 2A (no dimples were provided, and the cooling device was operated), and a comparative example 3A (dimples were provided, and the cooling device was not operated). Results are shown with indices in which a running distance of the comparative example 2A is evaluated as 100. The greater the numeric value is, the more excellent the result is.

Figure 12:
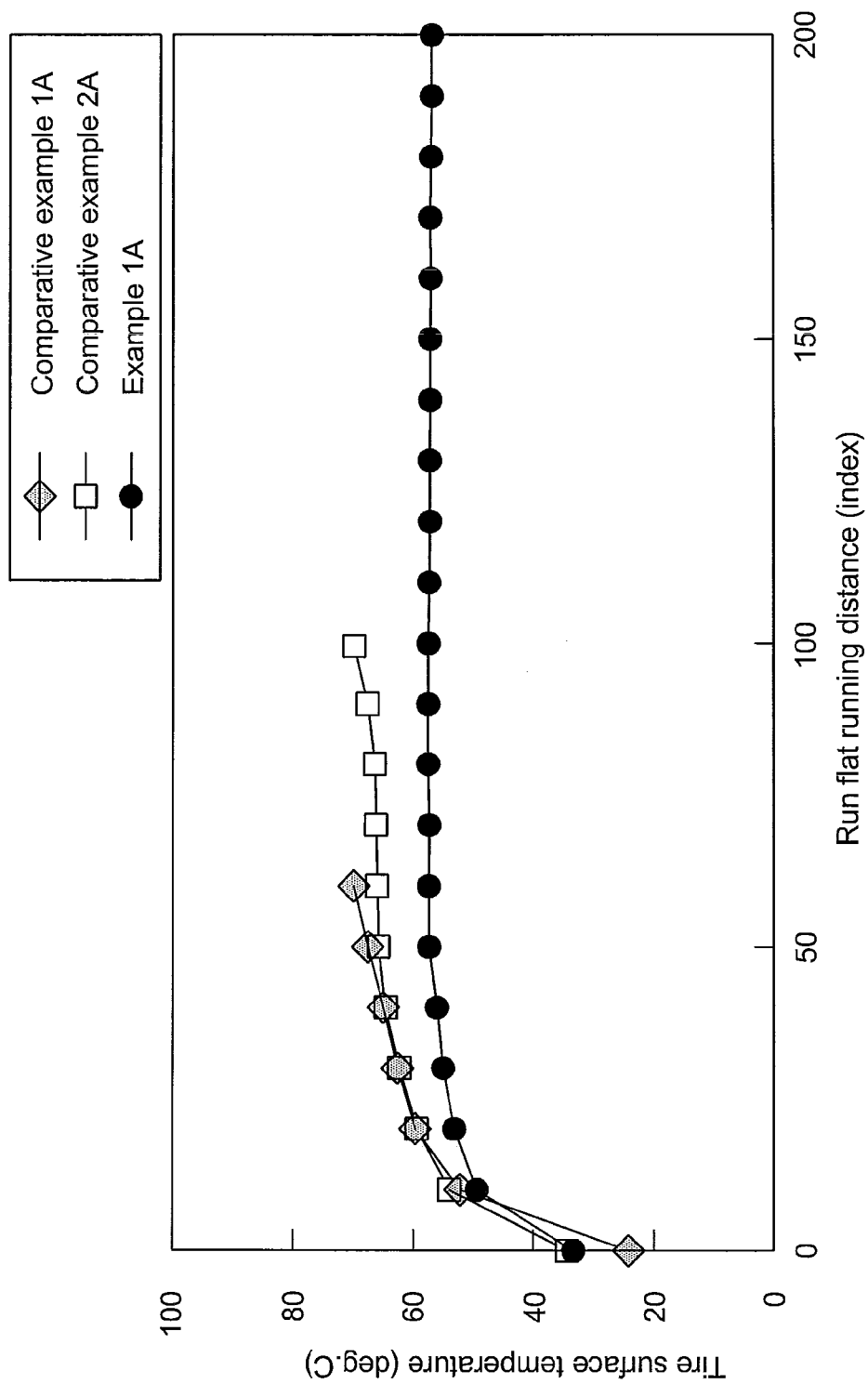
FIG. 12 is a graph showing a relation between a running distance index and a tire internal temperature.

Results of the test are shown in Table 1. FIG. 12 shows a relation between running distance indices and tire temperatures of the comparative examples 1A and 2A and the example 1A as representative examples. The temperature is an atmosphere temperature in the tire measured in the vicinity of an air valve of the tire by a temperature sensor.

TABLE 1

|  | Comparative example 1A | Comparative example 2A | Comparative example 3A | Example 1A | Example 2A | Example 3A | Example 4A | Example 5A |
| --- | --- | --- | --- | --- | --- | --- | --- | --- |
| Diameter D (mm) of dimple | — | — | 8 | 8 | 8 | 8 | 10 | 8 |
| Depth e (mm) of dimple | — | — | 1 | 1 | 1.5 | 2 | 2 | 2.5 |
| Thermal conductivity of sidewall rubber | 0.28 | 0.28 | 0.28 | 0.28 | 0.28 | 0.28 | 0.28 | 0.28 |
| Thermal conductivity of side-reinforcing rubber layer | 0.28 | 0.28 | 0.28 | 0.28 | 0.28 | 0.28 | 0.28 | 0.28 |
| Diameter d (mm) of bottom surface | — | — | 6 | 6 | 6 | 4 | 7 | 6 |
| Whether cooling device is operated or not | Not operated | Operated | Not operated | Operated | Operated | Operated | Operated | Operated |
| Running distance (index) | 65 | 100 | 80 | 200 | 250 | 160 | 185 | 170 |

As a result of the test, it could clearly be confirmed that a temperature rise of each of the vehicles of the examples during the run flat running was suppressed for a long term. According to this, it can be expected that durability is remarkably enhanced.

Next, a vehicle 1B of a second aspect of the invention will be described.

Figure 13:
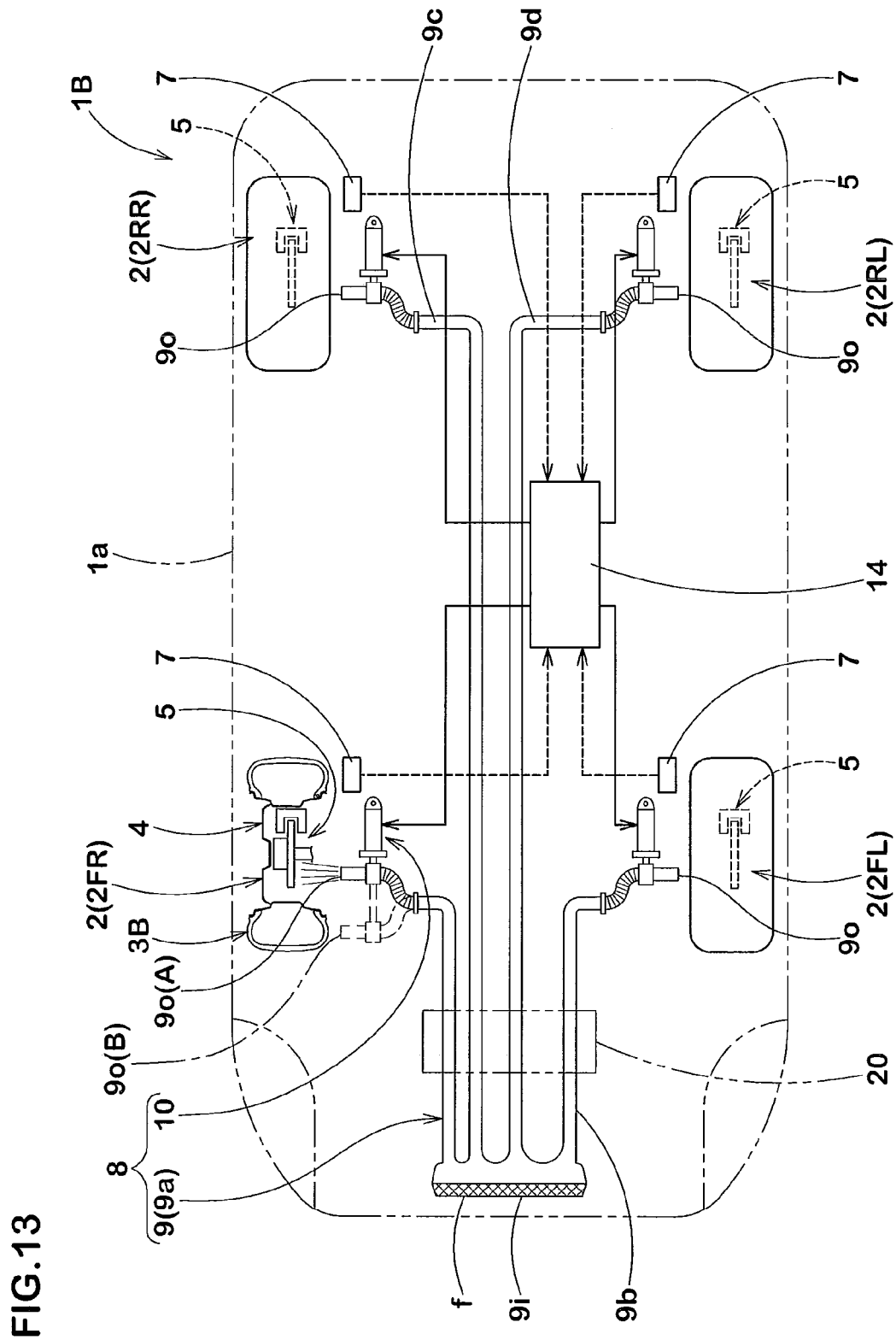
FIG. 13 is a schematic plan view of an embodiment of a vehicle according to a second aspect of the invention.
Figure 14:
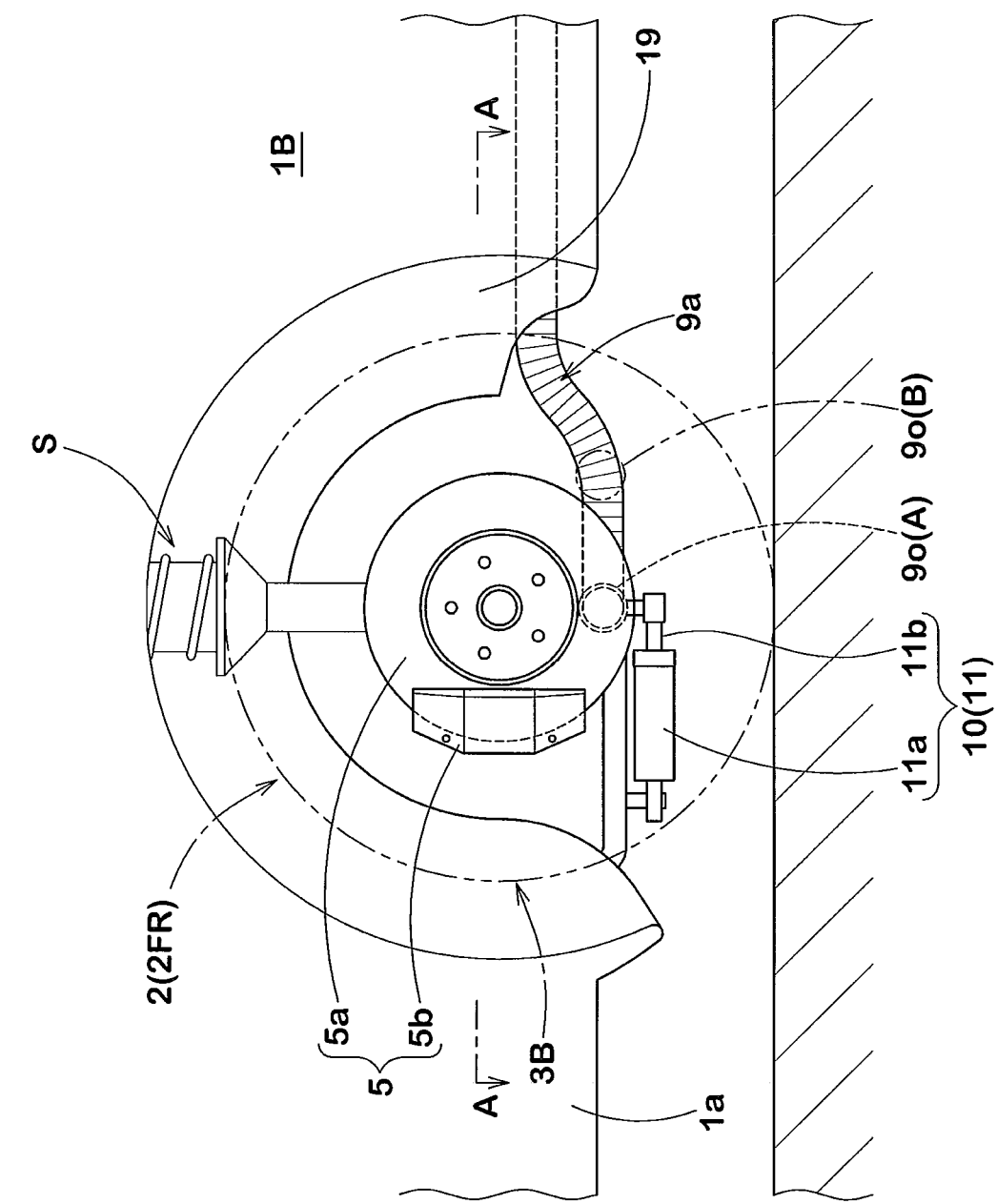
FIG. 14 is an enlarged view of an essential portion of a front right wheel and its periphery.
Figure 15:
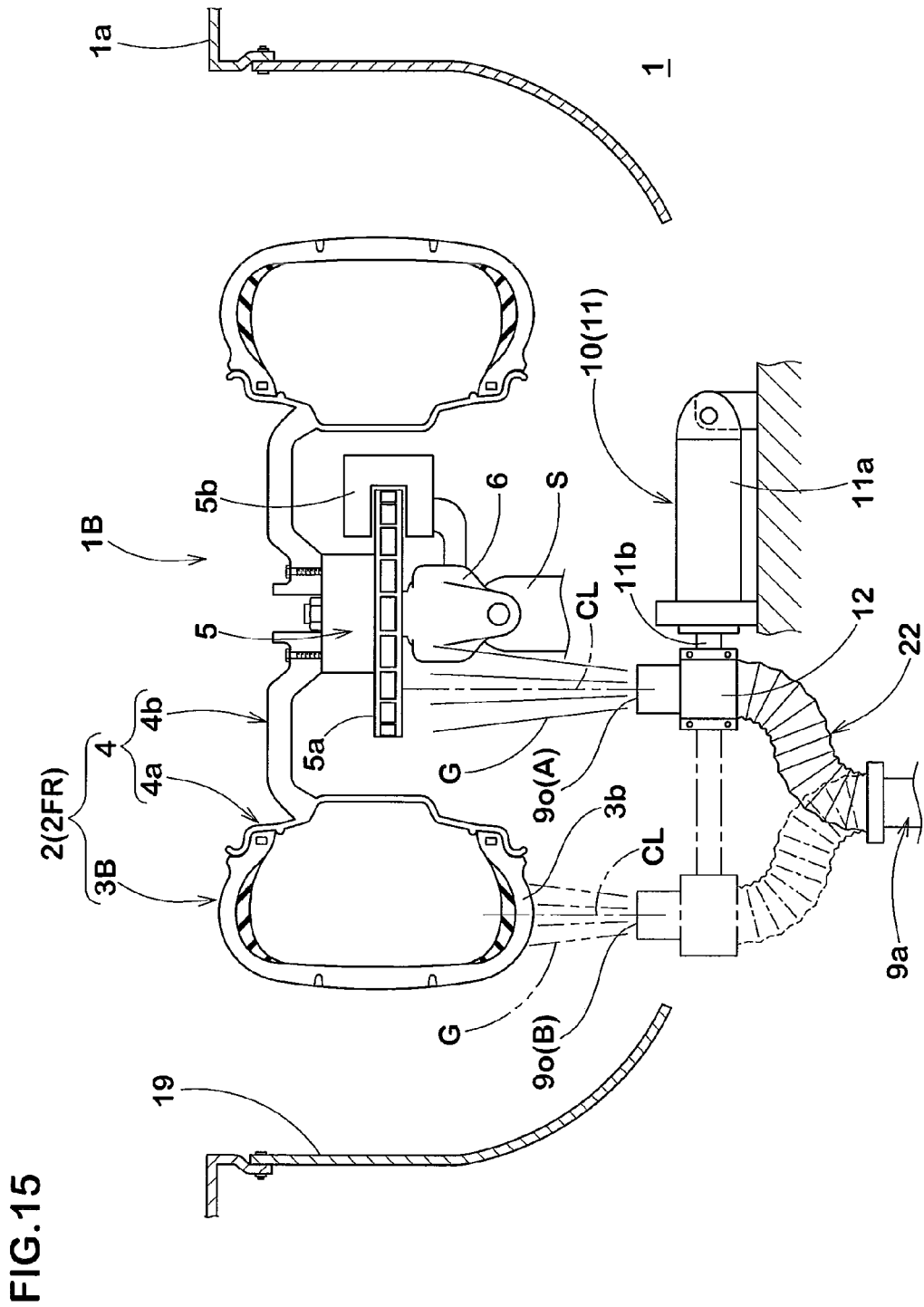
FIG. 15 is a cross sectional view taken along the line A-A in FIG. 14.

FIG. 13 is a schematic plan view of an embodiment of the vehicle 1B of the second aspect of the invention. The vehicle 1B is a four-wheel car (passenger vehicle) like the vehicle 1A, and a vehicle body 1a thereof has four wheels 2, i.e., the front right wheel 2FR, the front left wheel 2FL, the rear right wheel 2RR and the rear left wheel 2RL. As shown in FIGS. 14 and 15, each wheel 2 includes a pneumatic tire 3B and a wheel rim 4 around which the pneumatic tire 3B is assembled.

The vehicle 1A of the first aspect of the invention and the vehicle 1B of the second aspect of the invention are different from each other in the mounted pneumatic tires. More specifically, the pneumatic tire 3A mounted on the vehicle 1A of the first aspect of the invention is required that the large number of dimples 13 are formed in the outside surface of at least one of the sidewalls 3b. On the other hand, the pneumatic tire 3B mounted on the vehicle 1B of the second aspect of the invention is required that at least a portion of the outside surface of the sidewall 3b is formed of good-thermal-conductivity rubber having thermal conductivity of 0.40 W/(m·K) or more.

Figure 16:
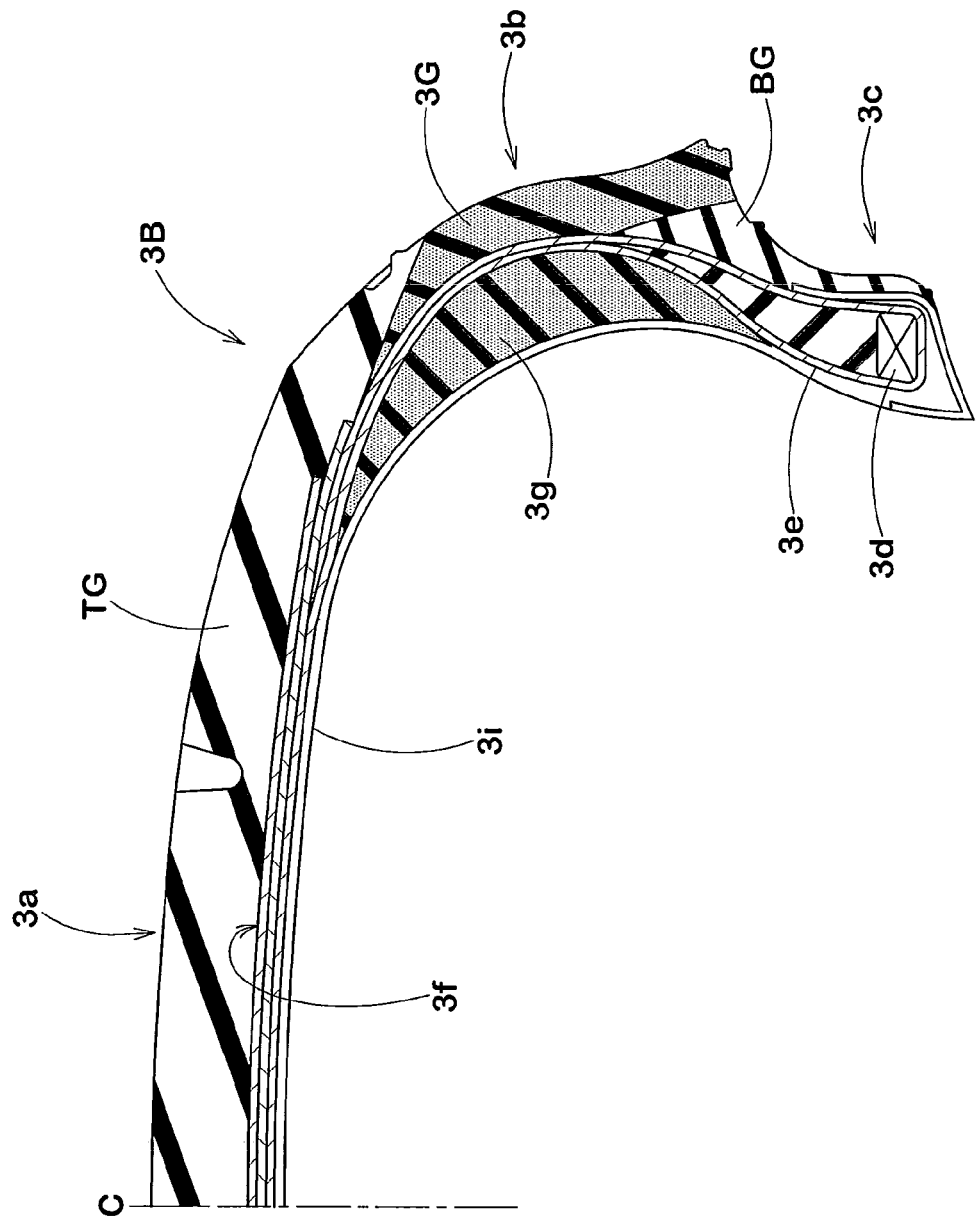
FIG. 16 is a cross sectional view of a pneumatic tire used for the vehicle of the second aspect of the invention.

As shown in FIG. 16 in a close-up manner, the pneumatic tire 3B includes a tread 3a, sidewalls 3b, beads 3c, carcasses 3e and a belt layer 3f, like the pneumatic tire 3A.

In this embodiment, the pneumatic tire 3B is formed as a run flat tire in which a side-reinforcing rubber layer 3g having a substantially crescentic cross section is disposed in each of the sidewalls 3b inside the carcass 3e, like the pneumatic tire 3A. However, it is not absolutely necessary that the vehicle 1B of the second aspect of the invention is a run flat tire.

The pneumatic tire 3B includes a tread rubber TG disposed on an outer side of the belt layer 3f of the tread 3a, sidewall rubbers SG disposed on an outer side of the carcass 3e of the sidewall 3b and extending radially inward and outward of the tire, and a bead rubber BG connected to the sidewall rubber SG and disposed on the bead 3c.

At least a portion of the outside surface of at least one of the sidewalls 3b is made of good-thermal-conductivity rubber having a thermal conductivity of 0.40 W/(m·K) or more. In the pneumatic tire 3B of the embodiment, the pair of sidewall rubbers SG disposed on both sides of the tire equator C are made of the good-thermal-conductivity rubber. According to this, the outside surface of the sidewall 3b is made of good-thermal-conductivity rubber. Such good-thermal-conductivity rubber can easily be obtained by cross-linking rubber compositions including a base rubber and thermal conductive materials disposed in the base rubber for example.

Therefore, according to the pneumatic tire 3B, heat in the tire generated by running, e.g., heat of the side-reinforcing rubber layer 3g generated when the vehicle runs under a low internal pressure or when the vehicle runs with a complete flat tire is easily conducted to the outside surface of the sidewall 3b through the sidewall rubber SG made of good-thermal-conductivity rubber, adjacent to the side-reinforcing rubber layer 3g via the carcass 3e. The tire comes into contact with atmosphere and the heat is released outside. Therefore, the temperature rise of the pneumatic tire 3B during running is suppressed, and the durability of the tire is enhanced.

To more efficiently exert the above-described effect, it is preferable that the thermal conductivity of the good-thermal-conductivity rubber is 0.45 W/(m·K) or more, more preferably 0.70 W/(m·K) or more. If a large amount of thermal conductive material is mixed to enhance the thermal conductivity, wear resistance is deteriorated, rubber hardness and loss tangent tan δ are increased, and there is a fear that the riding comfort and rolling resistance are deteriorated. From this viewpoint, an upper limit of the thermal conductivity of the good-thermal-conductivity rubber is preferably 4.0 W/(m·K) or less.

According to the pneumatic tire 3B of the embodiment, both the tread rubber TG and the bead rubber BG are made of poor-thermal-conductivity rubber having thermal conductivity of less than 0.40 W/(m·K). Therefore, according to the pneumatic tire 3B of the embodiment also, the riding comfort is not deteriorated, and wear resistances of the tread rubber TG which comes into contact with a road surface and the bead rubber BG which comes into contact with the wheel rim 4 are not deteriorated.

At least a portion, preferably entire side-reinforcing rubber layer 3g may be made of good-thermal-conductivity rubber. In this case, heat of the side-reinforcing rubber layer 3g is more effectively conducted to the outside surface of the sidewall 3b, and the heat dissipation effect is further enhanced.

In this specification, thermal conductivities of rubber materials are measured under the following conditions by a measuring device "QTM-D3" produced by Kyoto Electronics Manufacturing Co, Ltd:

Measuring temperature: 25° C.
Measuring time: 60 seconds
Test piece: plate of 100 mm long, 50 mm wide and 10 mm thick, and a surface of the plate is smooth.

Examples of the base rubber of the good-thermal-conductivity rubber are natural rubber (NR), epoxidized natural rubber (ENR), polybutadiene (BR), styrene-butadiene copolymer (SBR), polyisoprene (IR), isobutylene-isoprene copolymer (IIR), acrylonitrile-butadiene copolymer (NBR), polychloroprene (CR), styrene-isoprene-butadiene copolymer (SIBR), styrene-isoprene copolymer and isoprene-butadiene copolymer. One of them or two or more of them may be used together. From a viewpoint of crush resistance and machining performance, diene-based rubber is preferable as the base rubber. A ratio of an amount of diene-based rubber occupied in the entire amount of the base rubber is preferably 40% by mass or more, and more preferably 60% by mass or more.

Examples of the thermal conductive materials are metal powder, metal oxide powder (e.g., perfect spherical alumina), metal fiber and carbon fiber. Thermal conductivity of lone thermal conductive material is preferably 100 W/(m·K) or more, and more preferably 120 W/(m·K) or more.

An especially preferable thermal conductive material is coal pitch-based carbon fiber. Raw material of the coal pitch-based carbon fiber is liquid crystal in which molecules are oriented in one direction. Therefore, this carbon fiber has high thermal conductivity, and carbon fiber in which thermal conductivity in an axial direction of the fiber is 500 W/(m·K) or more is especially preferable. If such carbon fibers are dispersed in the base rubber, good-thermal-conductivity rubber having high thermal conductivity is easily obtained.

The coal pitch-based carbon fiber is obtained by subjecting pitch fiber to graphitizing treatment. Examples of raw material of the pitch fiber are coal tar, coal tar pitch and coal liquefied material. One example of a producing method of the coal pitch-based carbon fiber is disclosed in Japanese Patent Application Publication No. H7-331536.

As the coal pitch-based carbon fiber, carbon fiber in which polyaromatic molecules are layered is especially preferable. A concrete example of preferable coal pitch-based carbon fiber is a trade name "K6371" produced by Mitsubishi Plastics, Inc.

An average diameter of the coal pitch-based carbon fibers is not especially limited, but to obtain excellent dispersive performance in the base rubber, the average diameter is preferably 1 μm or more, more preferably 3 μm or more, and more preferably 5 μm or more, and its upper limit is preferably 80 μm or less, more preferably 30 μm or less, and more preferably 20 μm or less.

An average length of the coal pitch-based carbon fibers is not especially limited, but to obtain excellent dispersive performance in the base rubber, the average length is preferably 0.1 mm or more, more preferably 1 mm or more, more preferably 4 mm or more, and its upper limit is preferably 30 mm or less, more preferably 15 mm or less, and more preferably 10 mm or less.

The average diameter and the average length can be measured by observing cross sections of the sidewall rubbers SG by an electron microscope.

From a viewpoint of thermal conductivity of the sidewall rubber SG and riding comfort of the pneumatic tire 3B, an aspect ratio (average length/average diameter) of the coal pitch-based carbon fiber is preferably 100 or more and more preferably 300 or more. From a viewpoint of dispersive performance of carbon fiber, an upper limit of the aspect ratio is preferably 2,000 or less and more preferably 1,000 or less.

To obtain excellent thermal conductivity, a mixing amount of thermal conductive material is preferably 1 part by mass or more with respect to 100 parts by mass of base rubber, more preferably 5 parts by mass or more, and still more preferably 10 parts by mass or more. If the mixing amount of the thermal conductive material is excessively increased, this is not preferable because there is a tendency that the rubber hardness of the sidewall rubber SG and the loss tangent tan δ are increased. From this viewpoint, the mixing amount of the thermal conductive material is preferably 60 parts by mass or less with respect to 100 parts by mass of base rubber, more preferably 50 parts by mass or less, and still more preferably 40 parts by mass or less.

A rubber composition of the good-thermal-conductivity rubber includes sulfur. Rubber molecules are cross-linked by the sulfur. Other cross-linkers may be used in addition to or instead of sulfur. The good-thermal-conductivity rubbers may be cross-linked by electron beam.

A rubber composition of the good-thermal-conductivity rubber may include vulcanization accelerator together with sulfur. Examples of the vulcanization accelerator are sulfenamide-based vulcanization accelerator, guanidine-based vulcanization accelerator, thiazole-based vulcanization accelerator, thiuram-based vulcanization accelerator and dithiocarbamate-based vulcanization accelerator. An especially preferable vulcanization accelerator is sulfenamide-based vulcanization accelerator. Concrete examples of the sulfenamide-based vulcanization accelerator are N-cyclohexyl-2-benzothiazolyl sulfenamide, N-tert-butyl-2-benzothiazolyl sulfenamide and N, N'-dicyclohexyl-2-benzothiazolyl sulfenamide.

The rubber composition may include a reinforcing material. A typical reinforcing material is a carbon black, and it is possible to use FEF, GPF, HAF, ISAF and/or SAF for example. From a viewpoint of strength of the sidewall rubber SG, a mixing amount of carbon black is preferably 5 parts by mass or more with respect to 100 parts by mass of base rubber, and more preferably 15 parts by mass or more. From a viewpoint of kneading performance of the rubber composition, an upper limit of the mixing amount of the carbon black is preferably 50 parts by mass or less, and more preferably 40 parts by mass or less.

As the rubber composition of the good-thermal-conductivity rubber, silica may be used together with carbon black or instead of carbon black. Dry silica or wet silica can be used as the silica. Stearic acid, zinc oxide, age inhibitor, wax or cross-linking aid is added to the rubber composition of the good-thermal-conductivity rubber if needed.

Figure 17:
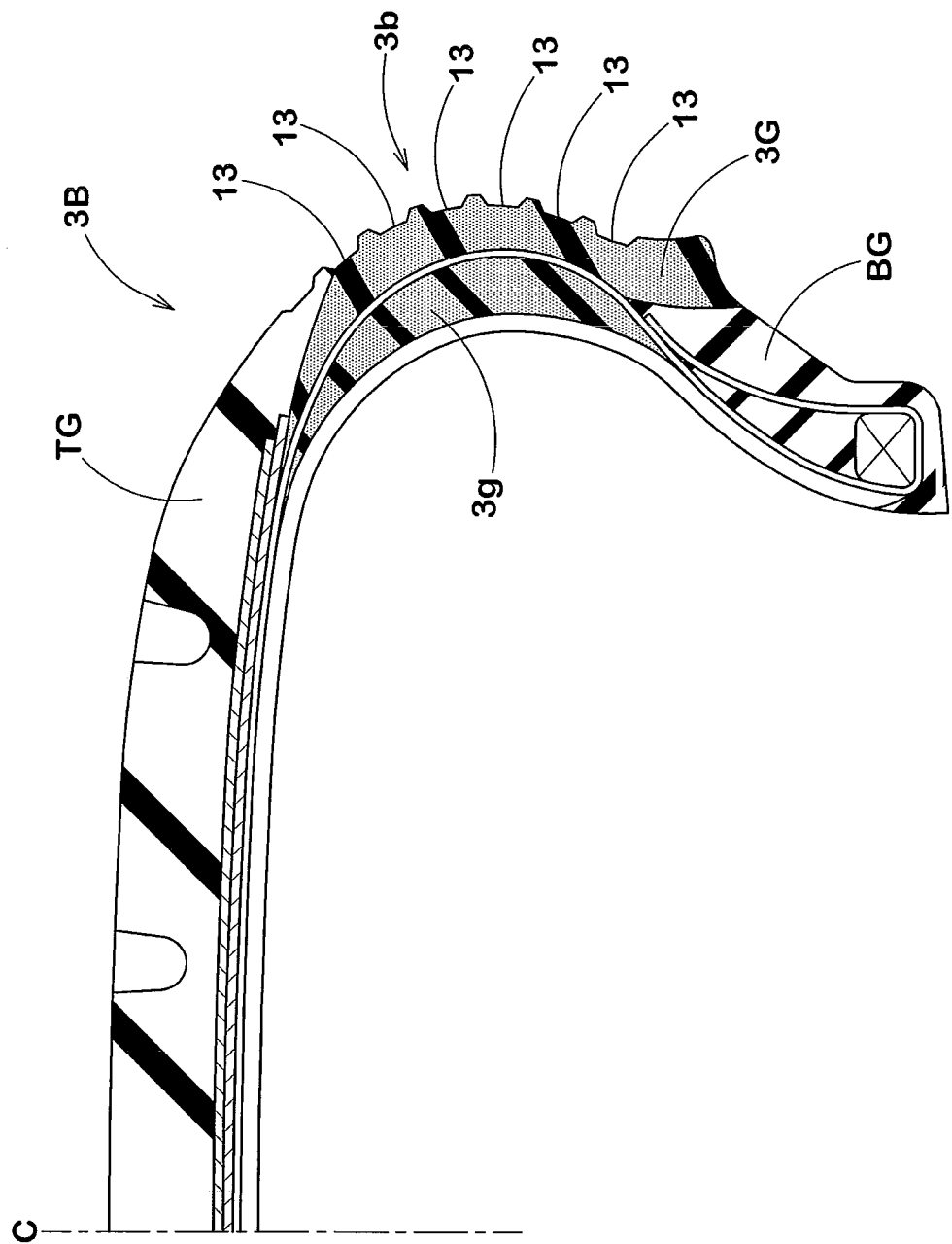
FIG. 17 is a cross sectional view showing another embodiment of the pneumatic tire used for the vehicle of the second aspect of the invention.

In this embodiment, the outside surface of the sidewall 3b is formed from a smooth surface (fine convexo-concave decorated portions including emblems such as characters, graphics and symbols may partially be included) like the conventional tire. However, to further enhance the heat dissipation effect and to suppress the temperature rise, a large number of dimples 13 having the same configuration as that described in the vehicle 1A may be formed in the outside surface of the sidewall 3b as shown in FIG. 17.

Next, as the wheel rim 4 around which the pneumatic tire 3B is assembled, one having the same configuration as that of the wheel rim 4 described in the vehicle 1A can preferably be employed. This wheel rim 4 is also fixed to a hub (not shown) through the brake device 5 including the brake rotor 5a and the caliper 5b like the vehicle 1A. The hub is mounted on the knuckle 6 through a bearing, and the knuckle 6 is vertically movably and turnably provided on the vehicle body 1a through the suspension device S.

The vehicle 1B of the second aspect of the invention is provided with a cooling device 8. The cooling device 8 blows gas G to the outside surface of the sidewall rubber SG made of good-thermal-conductivity rubber, thereby cooling the tire from outside. In this embodiment, as shown in FIG. 13, the vehicle 1B is provided with the air-pressure monitoring device 7 which monitors an air pressure in each wheel 2 like the vehicle 1A. When the air pressure in the pneumatic tire 3B is reduced, the cooling device 8 is operated. The air-pressure monitoring device 7 and the cooling device 8 having the same configurations as those described in the vehicle 1A can preferably be employed as the air-pressure monitoring device 7 and the cooling device 8 used in the vehicle 1B.

The vehicle 1B of the second aspect of the invention also blows gas G, from outside, to the sidewall 3b of the tire 3B which runs in a state where the air pressure is reduced and which is prone to generate heat. Therefore, it is possible to draw the heat and cool the tire 3B. Further, since the outside surface of the sidewall 3b of the tire 3B is made of good-thermal-conductivity rubber, heat in the tire 3B is more effectively dissipated and the durability of the tire is critically enhanced by a synergetic effect with the cooling device 8.

Therefore, in the vehicle 1B also, it is possible to suppress heat generation of the pneumatic tire 3B which runs under a low air pressure and to significantly enhance the durability without excessively increasing a vertical spring constant of the tire 3B (i.e., without extremely deteriorating the riding comfort). Especially when the tire 3B is a run flat tire, it is possible to remarkably increase a run flat continuous running distance and/or a run flat running speed.

Although the embodiment of the vehicle 1B of the second aspect of the invention has been described above, the present invention is not limited to the embodiment, and the invention can variously be modified and carried out. As other modifications, at least the following modifications are included in the present invention.

[Modification 1]

The cooling device 8 also cools the brake device in the embodiment. Alternatively, the cooling device 8 can also blow a portion of air toward an in-car heat generating device such as a turbine of a supercharger and a radiator instead of the brake device.

[Modification 2]

According to the above embodiments, all of the wheels 2 are provided with the issuing ports 9b which can discharge gas G. In the case of a Front-engine Front-drive vehicle, the cooling devices 8 may be provided only in the front wheels which are driving wheels having large axle weights and whose piping operations are easy.

[Modification 3]

According to the above embodiments, the control device 14 automatically controls the blowing operation of air toward the pneumatic tire 3B. Alternatively, an operation switch (not shown) for driving the cooling device may be provided on a driver's seat, and a signal of the operation switch may be input to the control device 14. According to this configuration, it is possible to forcibly and manually blow air to any of the tires by a remote operation from the driver's seat.

[Modification 4]

The cooling device 8 can blow gas for cooling the pneumatic tire 3B from outside even before an air pressure in the pneumatic tire 3B is reduced. In this case also, since the generation of heat of the tire is suppressed, the energy loss is reduced and a rolling resistance is reduced. Hence, fuel economy of the vehicle 1B can be enhanced.

[Modification 5]

The sidewall rubber SG may be formed from a plurality of inner and outer layers in the axial direction of the tire, an outermost layer thereof may be made of good-thermal-conductivity rubber, and other layers may be made of poor-thermal-conductivity rubber.

EXAMPLE B

To confirm the effect of the second aspect of the invention, a run flat running test was carried out using the following vehicles. The vehicles have substantially the same specifications other than those described in Tables. Specifications of the vehicles are as follows:

Displacement: Japanese rear-wheel drive vehicle of 4,300 cc

Tire size (all wheels): run flat tire of 245/40R18

Tire structure: as shown in FIG. 16

Thermal conductivity of various rubbers of the tire: as shown in Tables 2 and 3

Front wheel load: 5.29 kN

Rear wheel load: 5.39 kN

Front wheel camber angle: 1° (negative)

The vehicles were provided with cooling devices.

Specifications of the examples and comparative examples are as follows.

[Tire of Example B]

The following elements were kneaded by a Banbury mixer: 60 parts by mass of natural rubber (RSS#3), 40 parts by mass of polybutadiene (trade name "BR150B" produced by Ube Industries, Ltd.), 20 parts by mass of FEF carbon black (trade name "Diablack E" produced by Mitsubishi chemical corporation), coal pitch-based carbon fiber (trade name "K6371T" produced by Mitsubishi Plastics, Inc.) in the amount (part by mass) described in Tables 2 and 3 as thermal conductive material, 1.5 parts by mass of age inhibitor (trade name "Antigen 6c" produced by Sumitomo chemical Co., Ltd.), 1.0 part by mass of other age inhibitor (trade name "Antigen FR" produced by Sumitomo Chemical Co., Ltd.), 3 parts by mass of zinc oxide (trade name "zinc oxide type 2" produced by Mitsui Mining & Smelting Co., Ltd.), and 1.0 part by mass of stearic acid (trade name "Tsubaki" produced by NOF corporation). And a rubber composition was obtained. This rubber composition is kneaded by an open roll and in this state, 5 parts by mass of powder sulfur (produced by Karuizawa Iou Kabushiki Kaisha), 2 part by mass of vulcanization accelerator (trade name "NOCCELER NS" produced by Ouchi Shinko chemical Industrial Co., Ltd.), and 2 parts by mass of vulcanization accelerator aid (trade name "TACKIROL V-200" produced by Taoka chemical Co., Ltd.) were added. This rubber composition was extruded, and a rubber sheet for the sidewall rubber was obtained. This rubber sheet and other rubber members are assembled, and a low cover (non-cross linked tire) was obtained. This low cover was placed in a mold, pressurized and heated, and a run flat tire of the example was produced. The tread rubber and the bead rubber were made of poor-thermal-conductivity rubber. Concerning the side-reinforcing rubber layer, the coal pitch-based carbon fibers were mixed in accordance with specifications shown in Tables 2 and 3, and thermal conductivity thereof was adjusted. A maximum thickness of the side-reinforcing rubber layer was set to 10 mm.

COMPARATIVE EXAMPLE 2A

The pneumatic tires which were the same as those of the comparative example 2A in Table 1 and whose sidewall rubber were made of the poor-thermal-conductivity rubber were mounted on all wheels, and the cooling device was operated.

COMPARATIVE EXAMPLE 3B

Pneumatic tires having the sidewall rubbers made of good-thermal-conductivity rubber were mounted on all wheels, and the cooling device was not operated.

In the run flat running test, a front right wheel was a flat tire having a zero air pressure (air pressures of other three tires were 230 kPa), the vehicle was made to continuously run on a high speed running test course of a dry asphalt road (weather: fine weather, temperature of 24° C.) at an average running speed of 80 km/h, and a run flat running distance until the tire was destroyed was checked. In the vehicles of the example, the cooling device was always operated during the test running, and air blew to a sidewall of the flat tire on an inner side of the vehicle at an average wind speed of about 50.4 km/h. Results are shown with indices in which a running distance of the comparative example 2A is evaluated as 100. The greater the numeric value is, the more excellent the result is.

Results of the test are shown in Tables 2 and 3.

TABLE 2

|  | Comparative example 2A | Comparative example 3B | Example 1B | Example 2B | Example 3B | Example 4B | Example 5B | Example 6B | Example 7B |
|---|---|---|---|---|---|---|---|---|---|
| Presence or absence of dimples in outside surface of sidewall | Absence | Absence | Absence | Absence | Absence | Absence | Absence | Absence | Absence |
| Mixing amount of thermal conductive material in sidewall rubber (part by mass) | 0 | 5 | 5 | 10 | 30 | 40 | 50 | 30 | 30 |
| Mixing amount of thermal conductive material in side-reinforcing rubber layer (part by mass) | 0 | 0 | 0 | 0 | 0 | 0 | 0 | 10 | 30 |
| Thermal conductivity of sidewall rubber W/(m·k) | 0.28 | 0.42 | 0.42 | 0.48 | 0.8 | 0.92 | 1.12 | 0.8 | 0.8 |
| Thermal conductivity of side-reinforcing rubber layer W/(m·k) | 0.28 | 0.28 | 0.28 | 0.28 | 0.28 | 0.28 | 0.28 | 0.5 | 0.7 |
| Whether cooling device is operated or not | Operated | Not Operated | Operated | Operated | Operated | Operated | Operated | Operated | Operated |
| Running distance (index) | 100 | 93 | 122 | 126 | 145 | 164 | 190 | 223 | 251 |

TABLE 3

|  | Example 2B | Example 8B | Example 9B | Example 10B | Example 11B | Example 12B |
|---|---|---|---|---|---|---|
| Presence or absence of dimples in outside surface of sidewall | Absence | Presence | Presence | Presence | Presence | Presence |
| Diameter D (mm) of dimple | — | 8 | 8 | 8 | 10 | 8 |
| Depth e (mm) of dimple | — | 1 | 1.5 | 2 | 2 | 2.5 |
| Diameter d (mm) of bottom surface | — | 6 | 6 | 4 | 7 | 6 |
| Mixing amount of thermal conductive material in sidewall rubber (part by mass) | 10 | 10 | 10 | 10 | 10 | 10 |
| Mixing amount of thermal conductive material in side-reinforcing rubber layer (part by mass) | 0 | 0 | 0 | 0 | 0 | 0 |
| Thermal conductivity of sidewall rubber W/(m·k) | 0.48 | 0.48 | 0.48 | 0.48 | 0.48 | 0.48 |
| Thermal conductivity of side-reinforcing rubber layer W/(m·k) | 0.28 | 0.28 | 0.28 | 0.28 | 0.28 | 0.28 |
| Whether cooling device is operated or not | Operated | Operated | Operated | Operated | Operated | Operated |
| Running distance (index) | 126 | 231 | 293 | 201 | 220 | 209 |

As a result of the test, it could be confirmed that a temperature rise of each of the vehicles of the examples during the run flat running was suppressed for a long term and as a result, it could be expected that durability was remarkably enhanced.

The invention claimed is:

1. A vehicle having pneumatic tires, wherein
plural dimples are present on an outside surface of at least one sidewall of each of the pneumatic tires,
the vehicle includes a cooling device which blows gas for cooling the pneumatic tire from an outside source, and wherein said cooling device includes
a duct which is provided at one end with an air induction port which takes in air and at the other end with an issuing port blows the air toward a brake device, and
a changeover tool which blows at least a portion of the air flowing through the duct toward the pneumatic tire when air pressure in the pneumatic tire is reduced.

2. The vehicle according to claim 1, wherein the dimples have a shape that is circular as viewed from above.

3. The vehicle according to claim 1 or 2, wherein the dimples have a diameter of 6 mm or more and 18 mm or less, and a depth of 0.5 mm or more and 3.0 mm or less.

4. The vehicle according to claim 1, wherein the pneumatic tire is a run flat tire having in each of the sidewalls a side-reinforcing rubber layer having a substantially crescentic cross section.

5. The vehicle according to claim 1, wherein the gas blows toward the outside surface of the sidewall provided with the dimples.

6. The vehicle according to claim 1, wherein the gas blows toward a portion of a tread which is located on an inner side of the vehicle as compared with a tire equator.

7. The vehicle according to claim 1, wherein the cooling device blows the gas toward the pneumatic tire when an air pressure in the pneumatic tire becomes equal to or lower than a predetermined value.

8. The vehicle according to claim 1, wherein the cooling device includes a duct, and the duct is provided at one end with an air induction port which takes in air, and at the other end with an issuing port which blows the air toward the pneumatic tire.

9. A vehicle having pneumatic tires, wherein
at least a portion of an outside surface of each pneumatic tire sidewall is made of a thermal conductive rubber having a thermal conductivity of 0.40 W/(m·K) or more,
the vehicle includes a cooling device which blows gas from an outside source to cool each pneumatic tire sidewall, and wherein said cooling device includes
a duct which is provided at one end with an air induction port which takes in air, and at the other end with an issuing port which blows the air toward a brake device, and
a changeover tool which blows at least a portion of the air flowing through the duct toward the pneumatic tire when an air pressure in the pneumatic tire is reduced.

10. The vehicle according to claim 9, wherein the thermal conductivity of the thermal conductive rubber is 0.45 W/(m·K) or more.

11. The vehicle according to claim 9, wherein the thermal conductivity of the thermal conductive rubber is 0.70 W/(m·K) or more.

12. The vehicle according to claim 9, wherein plural dimples are present on the outside surface of each pneumatic tire sidewall.

13. The vehicle according to claim 12, wherein the dimples have a circular shape as viewed from above.

14. The vehicle according to claim 13, wherein the dimples have a diameter of 6 mm or more and 18 mm or less, and a depth of 0.5 mm or more and 3.0 mm or less.

15. The vehicle according to claim 9, wherein the pneumatic tire is a run flat tire having in each of the sidewalls a side-reinforcing rubber layer having a substantially crescentic cross section.

16. The vehicle according to claim 15, wherein at least a portion of the side-reinforcing rubber layer is made of the thermal conductive rubber.

17. The vehicle according to claim 9, wherein the cooling device blows the gas toward the pneumatic tire when an air pressure in the pneumatic tire becomes equal to or lower than a predetermined value.

18. The vehicle according to claim 9, wherein the cooling device includes a duct, and the duct is provided at one end with an air induction port which takes in air, and at the other end with an issuing port which blows the air toward the pneumatic tire.

* * * * *